(12) United States Patent
Takahashi et al.

(10) Patent No.: US 10,438,443 B2
(45) Date of Patent: Oct. 8, 2019

(54) GAME SYSTEM, AND CONTROL METHOD AND STORAGE MEDIUM USED IN SAME

(71) Applicant: Konami Digital Entertainment Co., Ltd., Minato-ku, Tokyo (JP)

(72) Inventors: Hiroaki Takahashi, Minato-ku (JP); Keishi Terao, Minato-ku (JP); Eriko Motohashi, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 296 days.

(21) Appl. No.: 15/422,357

(22) Filed: Feb. 1, 2017

(65) Prior Publication Data

US 2017/0148258 A1 May 25, 2017

Related U.S. Application Data

(63) Continuation of application No. PCT/JP2015/054033, filed on Feb. 13, 2015.

(30) Foreign Application Priority Data

Aug. 8, 2014 (JP) .................................. 2014-162010

(51) Int. Cl.

| | |
|---|---|
| *G07F 17/32* | (2006.01) |
| *A63F 13/814* | (2014.01) |
| *A63F 13/35* | (2014.01) |
| *A63F 13/2145* | (2014.01) |
| *A63F 13/5375* | (2014.01) |

(Continued)

(52) U.S. Cl.
CPC ...... *G07F 17/3227* (2013.01); *A63F 13/2145* (2014.09); *A63F 13/31* (2014.09);
(Continued)

(58) Field of Classification Search
CPC ....................................................... G07F 17/32
USPC ........................................................... 463/42
See application file for complete search history.

(56) References Cited

U.S. PATENT DOCUMENTS

| | | | | |
|---|---|---|---|---|
| 6,225,547 B1 * | 5/2001 | Toyama | ................ | A63F 13/005 84/609 |
| 2006/0068917 A1 * | 3/2006 | Snoddy | .................. | A63F 13/22 463/42 |

FOREIGN PATENT DOCUMENTS

| | | |
|---|---|---|
| JP | 2001-321564 A | 11/2001 |
| JP | 2004-318139 A | 11/2004 |

(Continued)

OTHER PUBLICATIONS

Notification of Reason for Refusal (KR Patent Application No. 10-2017-7003392) Dispatch Date: Apr. 19, 2018.

(Continued)

*Primary Examiner* — Kevin Y Kim
(74) *Attorney, Agent, or Firm* — Howard & Howard Attorneys PLLC

(57) ABSTRACT

A game system provides a music game that is played simultaneously by a plurality of users. Moreover, this music game includes a plurality of demands for touch operation using objects. A game machine of the game system acquires allocation data including information about responsibility relations which are set between the objects and the users, so that the objects are shared by the users. And, on the basis of this allocation data, the game machine provides a responsibility region game screen which displays the objects so that, via a region of responsibility for displaying the objects assigned as responsibilities so that they are easy to see and another region for displaying the objects not assigned as responsibilities, the objects assigned as responsibilities for which responsibility relations are established and the objects not assigned as responsibilities can be easily distinguished.

12 Claims, 14 Drawing Sheets

(51) Int. Cl.
    *A63F 13/847*    (2014.01)
    *A63F 13/44*     (2014.01)
    *A63F 13/31*     (2014.01)
(52) U.S. Cl.
    CPC .............. *A63F 13/35* (2014.09); *A63F 13/44*
            (2014.09); *A63F 13/5375* (2014.09); *A63F
            13/814* (2014.09); *A63F 13/847* (2014.09);
            *G07F 17/3225* (2013.01); *G07F 17/3276*
                                              (2013.01)

(56)            References Cited

FOREIGN PATENT DOCUMENTS

JP          2005-287829 A      10/2005
JP          2008-003410 A      1/2008

OTHER PUBLICATIONS

International Search Report (English and Japanese), International Application No. PCT/JP2015/054033, dated May 12, 2015.
Written Opinion (English and Japanese), International Application No. PCT/JP2015/054033, dated May 12, 2015.
Notification of Reasons for Refusal (English and Japanese), Patent Application No. 2014-162010, Date of Drafting: Jan. 30, 2017.
Decision to Grant a Patent (JP Patent Application No. 2014-162010); dated Sep. 20, 2017; Includes English Translation; 7 pages.
Decision to Grant of Patent (KR Patent Application No. 10-2017-7003392); Dispatch Date: Jul. 27, 2018; Includes English Translation; 2 pages.

* cited by examiner

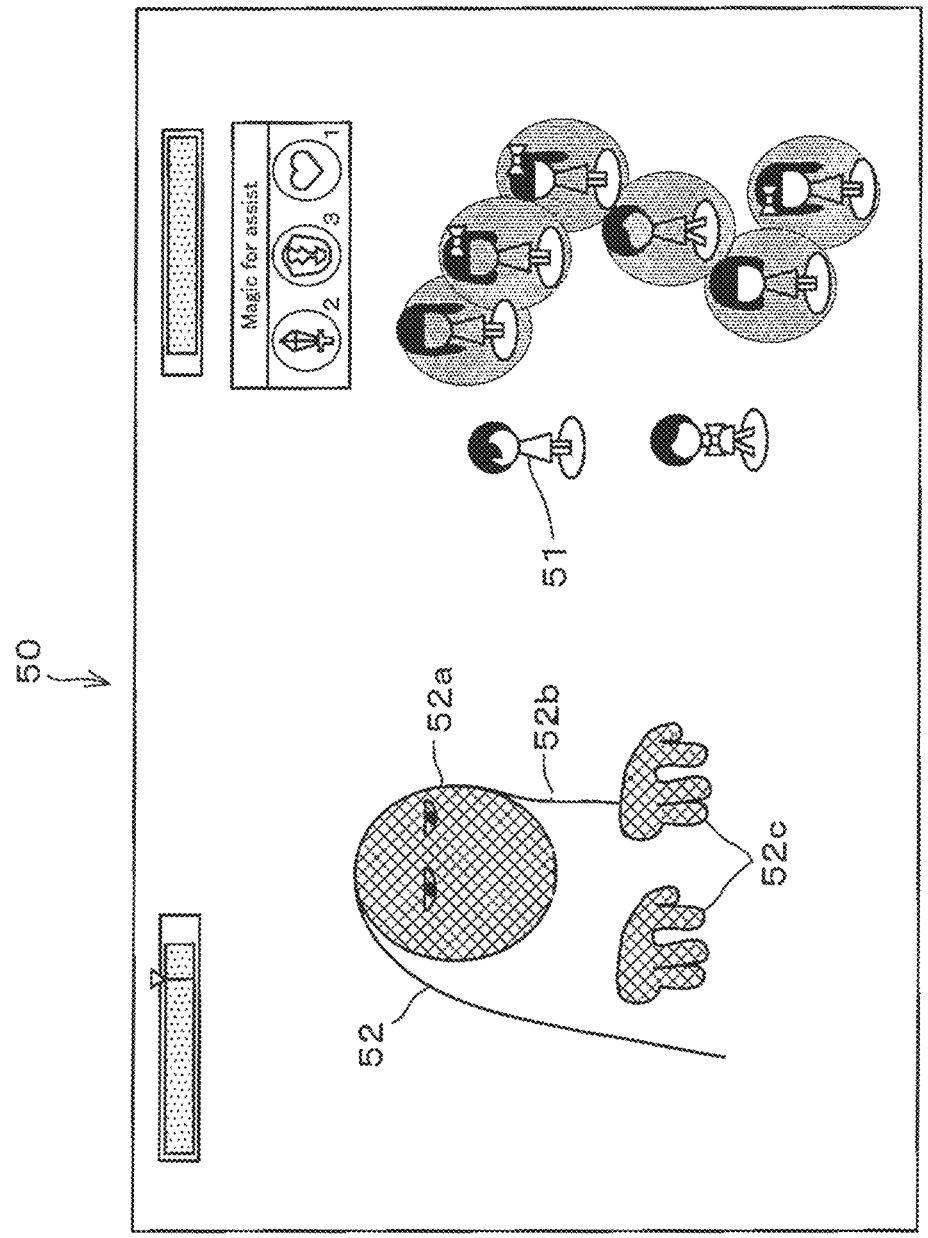

GAME SYSTEM, AND CONTROL METHOD AND STORAGE MEDIUM USED IN SAME

CROSS-REFERENCE TO RELATED APPLICATION

This application is a continuation of PCT Application No. PCT/JP2015/054033, filed Feb. 13, 2015, which claims priority to Japanese Patent Application No. 2014-162010, filed Aug. 8, 2014, the disclosures of which are hereby incorporated by reference in their entirety.

TECHNICAL FIELD

The present invention relates to a game system that provides a game that is played simultaneously by a plurality of users, and so on.

BACKGROUND ART

Games already exist that are played simultaneously by a plurality of users. As a display system for a game of this type, for example, a display system is per se known in which a single game screen is divided into a plurality of regions, one for each user, and in which, upon a display for each user, only the corresponding subdivided region is displayed in enlarged form (for example, refer to Patent Document #1).

CITATION LIST

Patent Literature

Patent Document #1: Japanese Laid Open Patent Publication 2004-318139.

SUMMARY OF INVENTION

Technical Problem

With a display system like that of Patent Document #1, simply, the single game screen is divided into a plurality of regions for each player, and only an enlarged display is provided for each subdivided region. In other words, with the display system of Patent Document #1, attention is only focused upon the display method, and demands to each user included in the game are not taken into consideration. Accordingly, demands within the game are only displayed for each region, and are not particularly allocated.

Accordingly, it is an object of the present invention to provide a game system and so on that, during a game, is capable of allocating a plurality of demands between a plurality of users.

Solution to Technical Problem

A game system of the present invention is a game system that provides a game played simultaneously by a plurality of users, wherein the game system comprises: an information acquisition device configured to, if the game includes a plurality of demands to the plurality of users, acquire information about responsibility relations that are set between the plurality of demands and the plurality of users, so that the plurality of demands are respectively allocated to the plurality of users; and a demand teaching device configured to, on the basis of the results of acquisition by the information acquisition device, teach a responsibility demand which is directed to a single user of the plurality of users, so that the responsibility demand, among the plurality of demands, for which a responsibility relation is set to at least the single user, is distinguished from other demands.

A control method of the present invention is a control method that causes a computer, installed to a game system that provides a game played simultaneously by a plurality of users, to execute: an information acquisition procedure of, if the game includes a plurality of demands to the plurality of users, acquiring information about responsibility relations that are set between the plurality of demands and the plurality of users, so that the plurality of demands are respectively allocated to the plurality of users; and a demand teaching procedure of, on the basis of the results of acquisition by the information acquisition device, teaching a responsibility demand which is directed to a single user of the plurality of users, so that the responsibility demand, among the plurality of demands, for which a responsibility relation is set to at least the single user, is distinguished from other demands.

A non-transitory computer readable storage medium storing a computer program of the present invention stores a computer program adapted to cause a computer, installed to a game system that provides a game played simultaneously by a plurality of users, to function as: an information acquisition device configured to, if the game includes a plurality of demands to the plurality of users, acquire information about responsibility relations that are set between the plurality of demands and the plurality of users, so that the plurality of demands are respectively allocated to the plurality of users; and a demand teaching device configured to, on the basis of the results of acquisition by the information acquisition device, teach a responsibility demand which is directed to a single user of the plurality of users, so that the responsibility demand, among the plurality of demands, for which a responsibility relation is set to at least the single user, is distinguished from other demands.

BRIEF DESCRIPTION OF DRAWINGS

FIG. 14 is an explanatory figure for explanation of an example of an action game that includes a plurality of demands.

DESCRIPTION OF EMBODIMENTS

Figure 1:
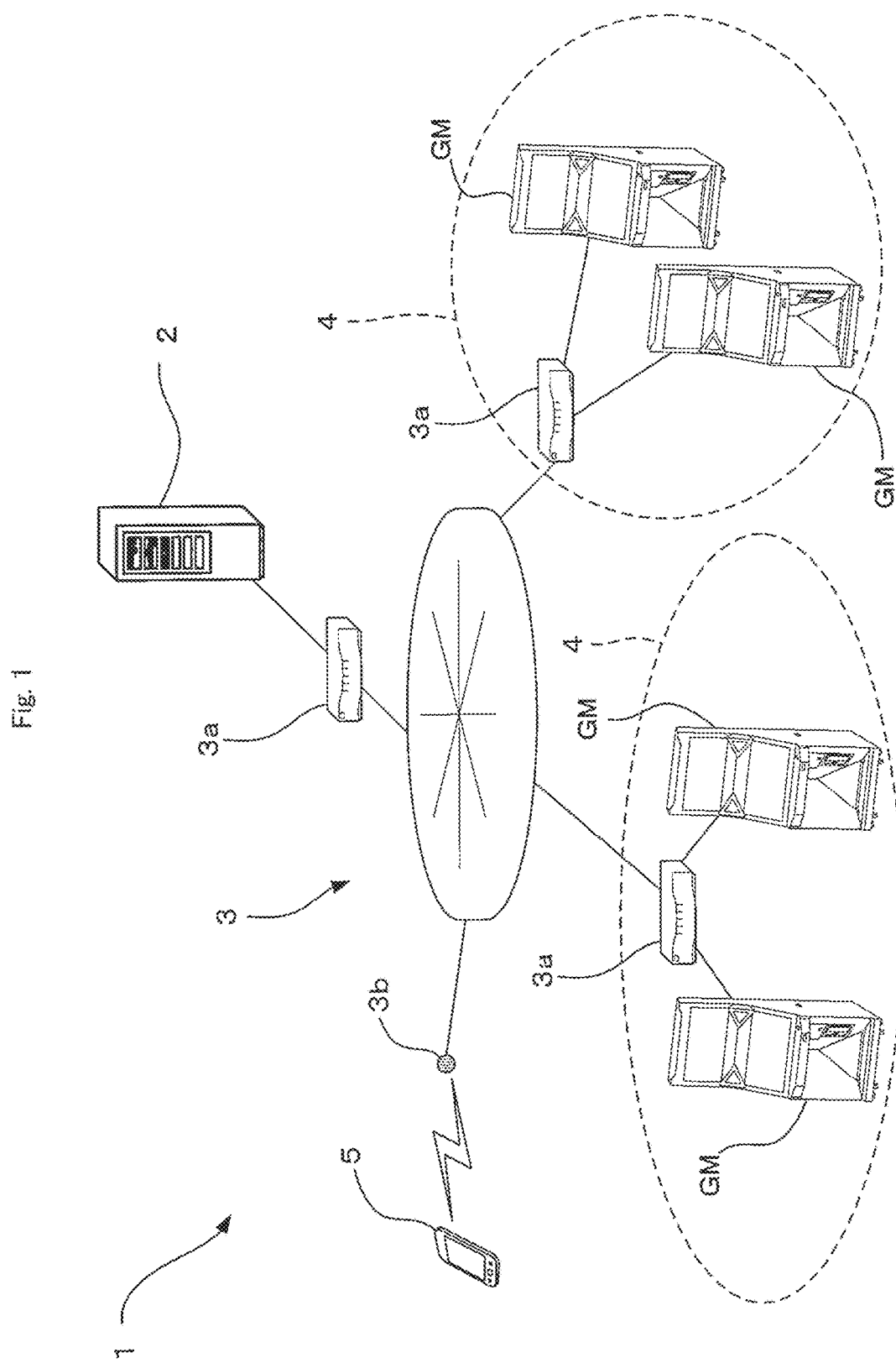
FIG. 1 is a figure showing a summary of the overall structure of a game system according to an embodiment of the present invention.

In the following, a game system according to an embodiment of the present invention will be explained. FIG. 1 is a figure showing a summary of the overall structure of a game system according to an embodiment of the present invention. As shown in FIG. 1, this game system 1 includes a central server 2 serving as a server apparatus and a plurality of game machines GM. The game machines GM are connected to the central server 2 via a network 3. The game machines GM are game machines for business use (i.e. for commercial use) that, in exchange for spending of a predetermined consideration, allow users to play a game within a range corresponding to that consideration. As one example, the game machines GM may provide a music game, which serves as a timing game, in exchange for spending of a predetermined consideration. An appropriate number of the game machines GM are installed in a commercial facility such as a shop 4 or the like. The central server 2 is not to be considered as being limited to this example in which it is constituted by a single physical device. For example, it would also be acceptable for a single logical central server 2 to be built as a server group incorporating a plurality of physical devices. Moreover, it would also be acceptable for a logical central server 2 to be built by employing cloud computing. Yet further, it would also be acceptable to arrange for one or more of the game machines GM to function as the central server 2.

Furthermore, the central server 2 is connected to a user terminal 5 via a network 3. This user terminal 5 is a type of network terminal device that implements functions of various types by executing software that is distributed from the central server 2. In the example shown in FIG. 1, a portable telephone (which may be a smart phone) is employed as one example of a user terminal 5. Moreover, apart from the above, for example, a network terminal device of any of various types that can be connected to the network and that provides personal applications to an individual user such as a personal computer, a portable type game machine, a so-called portable type tablet terminal device, may be employed as a user terminal 5.

As one example, the network 3 may be configured so as to implement network communication by employing the TCP/IP protocol. Typically, the network 3 is built as a combination of an internet such as a WAN and an intranet such as a LAN. In the example shown in FIG. 1, the central server 2 and the game machines GM are connected to the network 3 via routers 3a, and the user terminal 5 is connected via an access point 3b.

It should be understood that the format of the protocol employed by the network 3 is not to be considered as being limited to the TCP/IP protocol format. For the network 3, it would also be acceptable to employ formats of various types that use cable circuits or wireless circuits or the like for communication (including communication via infra-red, short distance wireless communication, or the like). Furthermore, it would be possible for mutual communication between the game machines GM within the shop 4 to be performed by any appropriate method. Alternatively, it would also be acceptable to implement communication between the user terminal 5 and the game machines GM or the like, not by employing any communication circuit (including cable and wireless), but rather, for example, by employing codes (for example two dimensional codes) generated in conformity to a predetermined standard so as to include information of various types. Accordingly, the term "network" (or "communication circuit") is here meant to include a communication method that utilizes a code of this type or the like, or any method of transmitting and receiving information without using a circuit.

The central server 2 provides various types of game machine services to the game machines GM or to their users. As game machine services, for example, the services of receiving information for authenticating users from the game machines GM, and of authenticating those users, may be supplied. Moreover, the services may also be supplied of receiving and storing play data of authenticated users from the game machines GM, and of supplying stored play data to the game machines GM. Yet further, the game machine services may also include a service of distributing and updating programs or data for the game machines GM via the network 3, a matching service of matching users with one another via the network 3 when a plurality of users are playing the same game, and so on.

Furthermore, the central server 2 provides web services of various types to the user of the user terminal 5. Web services may include, for example, game information services that provide information of various types related to games that are supplied by the game machine GM. Moreover, web services may also include distribution services of distributing data or software of various types to each user terminal 5 (including updating of data and so on). Yet further, apart from the above, web services may also include services such as a community service for provision of a so-called place of exchange for generation, transmission, exchanging, and sharing of information by users, services for assigning user IDs for identifying users, and so on.

Figure 2:
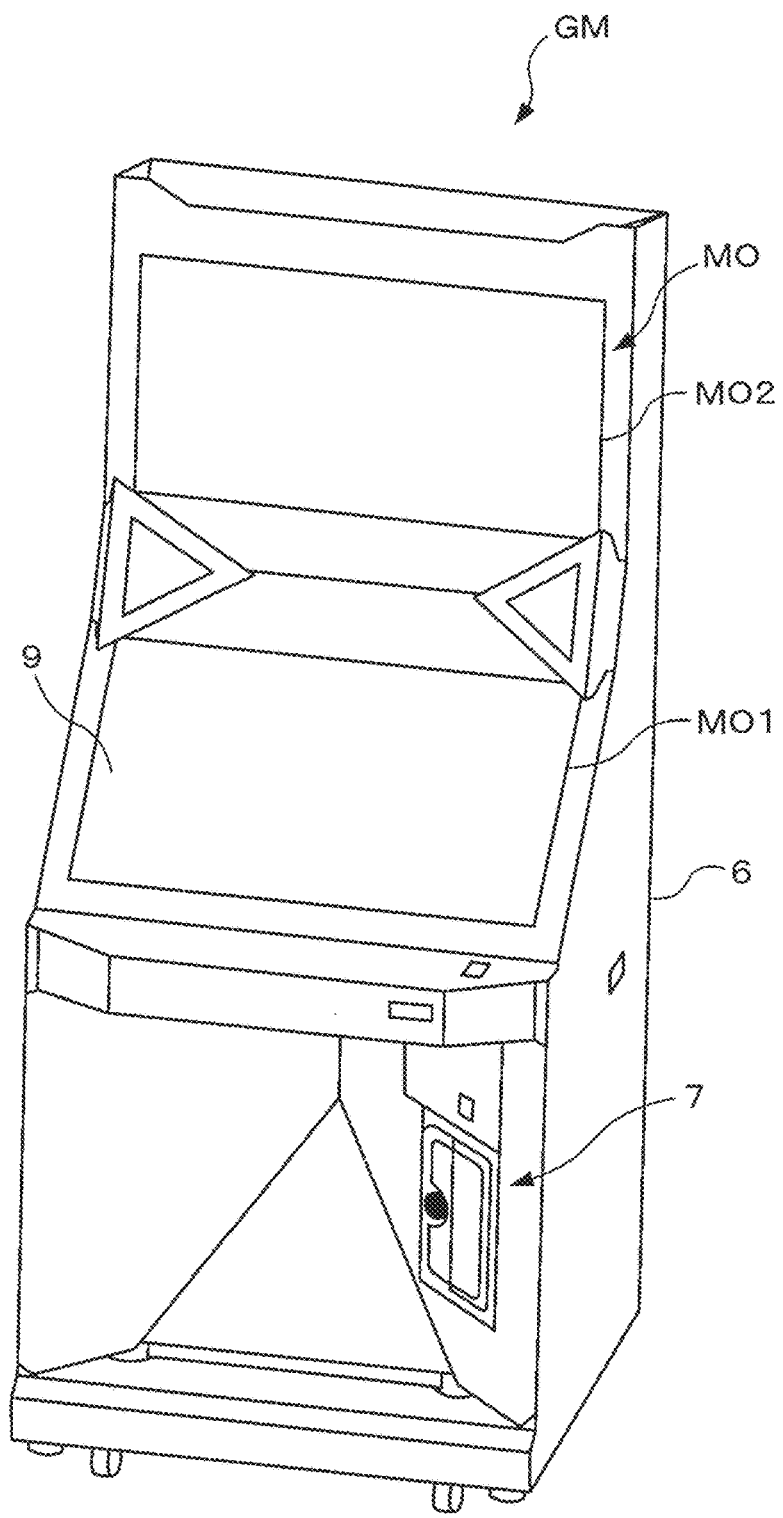
FIG. 2 is a figure showing the external appearance of a game machine.

FIG. 2 is a figure showing the external appearance of one of the game machines GM. As shown in FIG. 2, the game machine GM comprises a chassis 6. A coin collection device 7 and two monitors MO are provided on the front side of the chassis 6 (i.e. on its side that is presented to and is utilized by the user). This coin collection device 7 is a per se known device for collecting coins, which serve as predetermined play considerations. The two monitors MO are disposed above the coin collection device 7. In more concrete terms, the two monitors MO include a lower monitor section MO1 which serves as a display device and an upper monitor section MO2. The lower monitor section MO1 is disposed slantingly on the front side, so that its surface is sloped. Mainly, a game screen (to be described hereinafter) is displayed upon this lower monitor section MO1. On the other hand, the upper monitor section MO2 is disposed upon a higher portion of the device than the lower monitor section MO1. Mainly, information or presentations of various types corresponding to the game are displayed upon the upper monitor section MO2. In the following, when no distinction is to be made between the lower monitor section MO1 and the upper monitor section MO2, the term "monitor MO" will be employed.

Furthermore, a transparent touch panel 9 is overlaid over the front surface of the lower monitor section MO1. This touch panel 9 is a per se known input device that, when touched by the finger or the like of the user P, outputs a signal corresponding to the position of that contact. It should be understood that, in addition to the above, the game machine GM may be provided with input devices and output devices of various types that are equipped to conventional commercial game machines, such as buttons for selection and confirmation, a power supply switch, a volume control switch, a power supply lamp, and so on, but devices of those types are not shown in FIG. 2.

Figure 3:
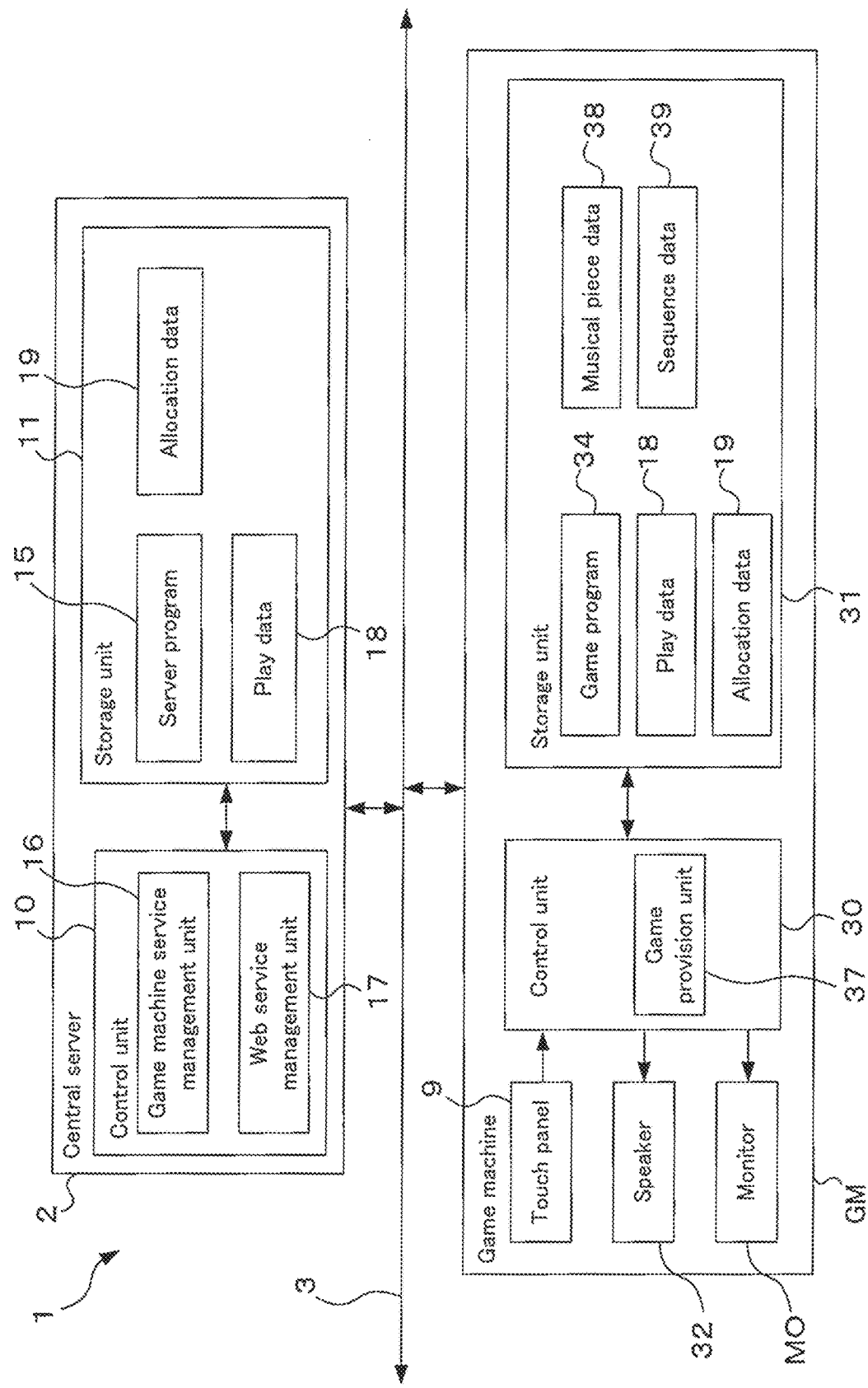
FIG. 3 is a figure showing the structure of principal portions of a control system of the game system.

Next, the principal portions of the control system of this game system 1 for implementing a music game will be explained. FIG. 3 is a figure showing the principal portions of the control system of the game system 1. As shown in FIG. 3, the central server 2 comprises a control unit 10 and a storage unit 11. The control unit 10 is built as a computer unit in which a microprocessor and peripheral devices of various types such as internal storage devices required for the operation of the microprocessor (for example, ROM and RAM) and so on are combined. It should be understood that, while input devices such as a keyboard and so on and output devices such as a monitor and so on, etc., may be connected to the control unit 10, those devices are not shown in the figure.

The storage unit 11 is connected to the control unit 10. The storage unit 11 is built as a high capacity storage medium such as, for example, a magnetic tape or the like, so as to be capable of maintaining storage even without any supply of power. A server program 15 is stored in the storage unit 11. This server program 15 is a computer program that is required in order for the central server 2 to provide services of various types to the game machines GM and to the user terminal 5. By the control unit 10 reading in and executing the server program 15, a game machine service management unit 16 and a web service management unit 17 are implemented internally to the control unit 10.

The game service management unit 16 executes processing for supplying the game machine services described above. On the other hand, the web service management unit 17 executes processing that is required for supplying the web services described above. The game machine service management unit 16 and the web service management unit 17 are logical devices that are implemented by combinations of computer hardware and computer programs. It should be understood that, while further logical devices of various types apart from the above may be provided internally to the control unit 10, these are not shown in the figures.

Furthermore, the storage unit 11 also stores data of various types that can be referred to along with execution of the server program 15. For example, ID management data, the play data 18 described above, and allocation data 19 may be included in these types of data. The ID management data is data for managing IDs of various types, such as user IDs and so on. And the play data 18 is data describing information related to the past play results of users. The play data may be used, for example, in order to inherit the play results (i.e. the past play record) of a user this time the game is played for the next time and subsequently, or to take over settings details specific to each user. And the details of the allocation data 19 will be described hereinafter.

On the other hand, a control unit 30 that serves as a computer, a storage unit 31, a speaker 32, the monitors MO described above, and a touch panel 9 are provided to the game machine GM. The storage unit 31, the speaker 32, the monitors MO, and the touch panel 9 are all connected to the control unit 30. The control unit 30 is built as a computer unit in which a microprocessor and peripheral devices of various types such as internal storage devices required for the operation of the microprocessor (for example, ROM and RAM) and so on are combined. It should be understood that while, in a similar manner to the case with other per se known types of game machine, input devices and/or output devices of various types may be connected to the control unit 30, such as for example the coin collection device 7 described above, a card reader, a control panel, and so on, no such devices are not shown in the figure.

The speaker 32 is a per se known audio output device that replays various types of audio on the basis of output signals from the control unit 30. As one example, according to output signals from the control unit 30, the speaker 32 may replay audio of various types for the music game, such as BGM and/or sound effects and so on. In a similar manner, the monitors MO are also display devices of per se known types for displaying images of various kinds and so on, on the basis of output signals from the control unit 30. And the touch panel also is a per se known type of input device. The touch panel 9 outputs a signal to the control unit 30 corresponding to the position where the user performs touch operation.

On the other hand, the storage unit 31 is capable of maintaining its storage even without supply of any electrical power; for example, it may be built to incorporate a magnetic recording medium, an optical recording medium, a flash SSD (Solid State Drive), or the like. A game program 34 is stored in the storage unit 31. This game program 34 is a computer program that is required in order for the game machine GM to supply the music game. Along with execution of the game program 34, a game provision unit 37 is provided in the interior of the control unit 30. This game provision unit 37 executes processing of various types required for provision of the music game. The game provision unit 37 is a logical device that is implemented by a combination of computer hardware and a computer program. It should be understood that, while further logical devices of various types apart from the above may be provided internally to the control unit 30, these are not shown in the figures.

Furthermore, data of various types is also stored in the storage unit 31 and can be referred to along with execution of the game program 34. Data of this kind includes, for example, image data, the ID management data and the play data 18 described above, the allocation data 19, musical piece data 38, and sequence data 39. At least portions of the ID management data, the play data 18, and the allocation data 19 may, as one example, be supplied from the central server 2, so as to include the required portions. The image data is data that is needed in order to display upon the monitors MO images of various types for the music game, such as game screens of various types and so on. The musical piece data is data that is needed for replaying audio of various types via the speaker 32, such as musical pieces used in the music game and so on. The details of the sequence data 39 will be described hereinafter, along with the details of the allocation data 19. It should be understood that, apart from the above, the various types of data described above may include, for example, data of various types required for providing the music game, but explanation of this aspect is omitted, and it is not shown in the figures.

Figure 4:
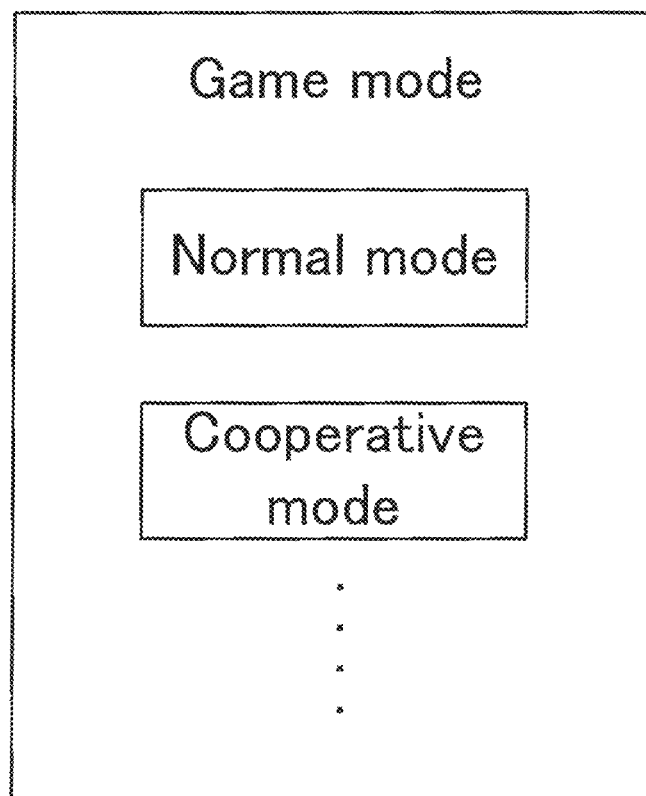
FIG. 4 is an explanatory figure for explanation of examples of game modes of several types that are provided by a music game.

Next, a game that is supplied by the game machine GM will be explained. A timing game is one example of a game that is supplied by the game machine GM. In this embodiment, a music game will be explained as one example of a timing game. This music game is a game of a type in which guidance is provided to the user as to timings at which appropriate play actions are to be executed as matched to a musical piece, and, when these appropriate play actions have been executed, the timings at which these play actions have been executed are evaluated. As one example, the music game may provide game modes of various types. FIG. 4 is an explanatory figure for explanation of examples of game modes of various types provided by this music game. As shown in FIG. 4, these game modes of various types provided by the music game may include, for example, a normal mode and a cooperative mode. Mainly, the normal mode is a mode for users to play the music game individually by themselves. And the cooperative mode is a mode for a plurality of users to play the music game with one another in a cooperative manner. It should be understood that the game modes of various types may also include other modes, such as, for example, a competition mode or the like.

Figure 5:
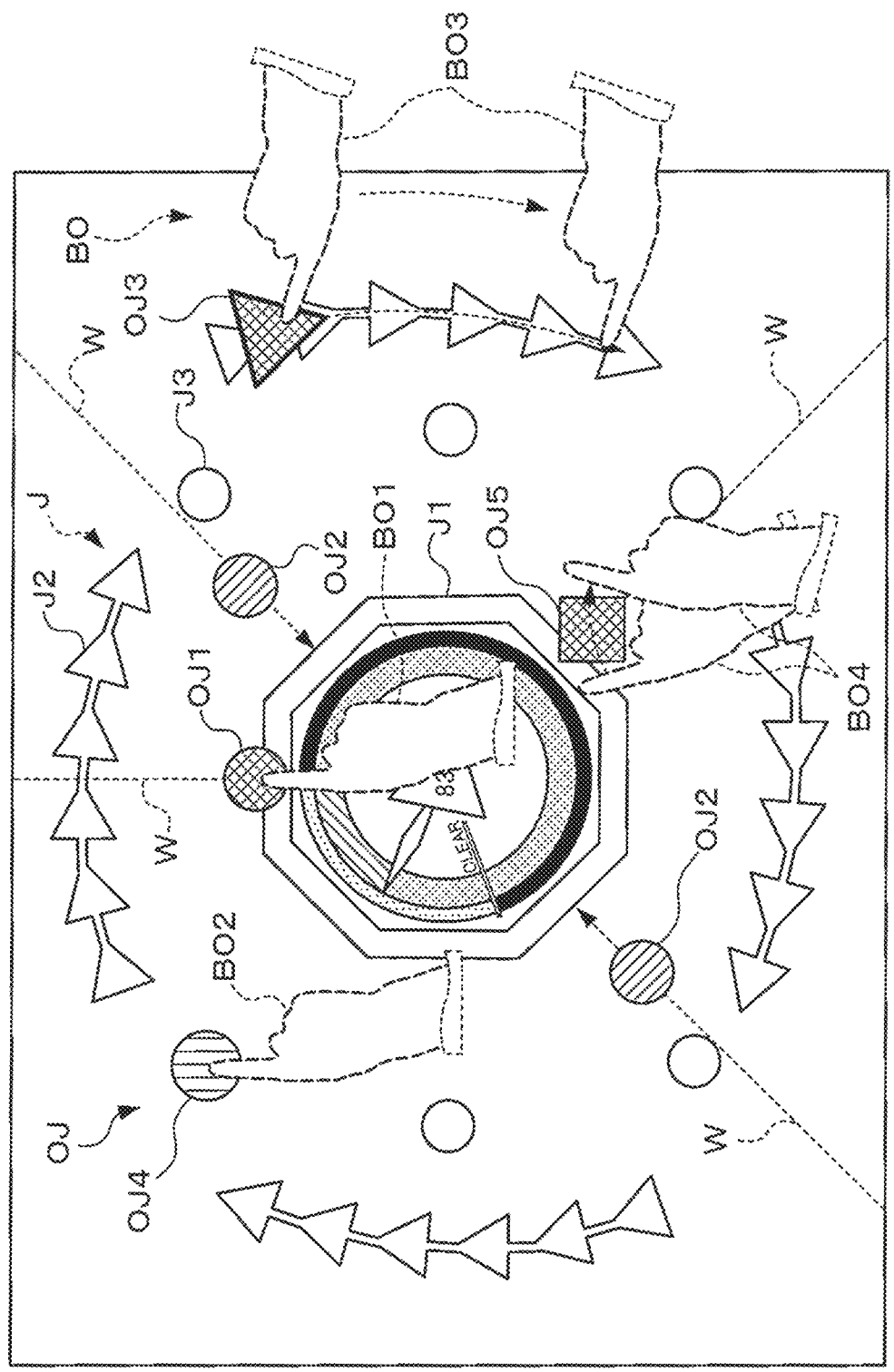
FIG. 5 is a figure schematically showing an example of a game screen employed in the music game.

First, the music game in the normal mode will be explained with reference to FIG. 5. FIG. 5 is a figure schematically showing an example of a game screen that is employed in the music game. As shown in FIG. 5, the game screen 45 includes a plurality of determination units J. Each of the determination units J functions as a reference for a position to be touched by the user. In concrete terms, the plurality of determination units J include a ring determination unit J1 that serves as a target unit, four stream determination units J2, and six ripple determination units J3. The ring determination unit J1 is a determination unit J that is formed in an octagonal shape, so as to surround a ring. Moreover, each of the ripple determination units J3 is a circular determination unit J. Furthermore, three of these ripple determination units J3 are arranged at predetermined intervals from one another at the left side of the ring determination unit J1 and three are arranged at its right side, so that the ring determination unit J1 is surrounded by these six ripple determination units J3. On the other hand, each of the stream determination units J2 consists of a plurality of triangles that are arranged in sequence along a single line. These four stream determination units J2 are disposed above and below the ring determination unit J1 and to its left and its right (and more outward than the ripple determination units J3), so as to surround the ring determination unit J1.

Furthermore, objects OJ of various types which serve as command marks appear at appropriate timings upon the game screen 45. And, for example, each of these objects OJ appears and moves at an appropriate timing, so as to arrive at one of the determination units J. Moreover, as appropriate play actions, the user is demanded to perform touch operation upon each of the objects OJ, matched to its arrival at a determination unit J or matched to its appearance at a determination unit J. Accordingly, the objects OJ are used for providing guidance as to the timings and the positions at which touch operations are to be performed. Furthermore, according to the types of the objects OJ, touch operations of various kinds are demanded. Accordingly, the types of the objects OJ are also employed for providing guidance as to the types of the touch operations that the user is supposed to perform upon the objects OJ. As examples, the objects OJ may include an individual object OJ1, a pair object OJ2, a triangular object OJ3, a ripple object OJ4, and a square object OJ5.

An individual object OJ1 is an object OJ that moves so as to arrive at one of the sides of the ring determination unit J1, matched to the rhythm of the music. Such an individual object OJ1 moves along a track W for ring (not actually shown) that extends from the outside of one of the stream determination units J2 toward the ring determination unit J1. And a pair object OJ2 consists of two individual objects OJ1 that appear as a pair. In concrete terms, a pair object OJ2 is two objects OJ that move so as to arrive simultaneously at different sides of the ring determination unit J1, matched to the rhythm of the music.

Each of the triangular objects OJ3 is an object OJ that appears at the end portion of one of the stream determination units J2, and that is to be moved along that stream determination unit J2. And the ripple objects OJ4 are objects OJ that appear upon each of the ripple determination units J3. In more concrete terms, a ripple object OJ4 appears concentrically with one of the ripple determination units J3 and has a larger diameter than that of the ripple determination unit J3, and gradually shrinks along with the passage of time so that its diameter agrees with the diameter of its ripple determination unit J. On the other hand a square object OJ5 is an object OJ that, like an individual object OJ1, moves along with the rhythm of the music so as to arrive at one of the sides of the ring determination unit J1. As one example, the square objects OJ5 may be guided by a type of touch operation that is different from that for the individual objects OJ1.

In the example of FIG. 5, examples of types of touch operation are shown by virtual operation images BO (which are not displayed upon the actual game screen 45). In concrete terms, in the example of FIG. 5, a first virtual operation image BO1 through a fourth operation image BO4 are shown as examples of virtual operation images BO. For example, the first virtual operation image BO1 indicates a touch operation upon the individual object OJ1. Specifically, the first virtual operation image BO1 indicates a touch operation in which the individual object OJ1 is touched as it arrives at the ring determination unit J1. In other words, an individual object OJ1 functions as an object OJ for which a touch operation corresponding to the first virtual operation image BO1 is demanded, at the timing that the individual object OJ1 arrives at the ring determination unit J1. The same is the case for the pair object OJ2. In concrete terms, a pair object OJ2 functions as an object OJ for which a touch operation is demanded, corresponding to the time point at which the first virtual operation images BO1 both arrive simultaneously at the ring determination unit J1.

In addition, the second virtual operation image BO2 indicates a touch operation on the ripple object OJ4. In concrete terms, the second virtual operation image BO2 indicates a touch operation of touching upon the ripple object OJ4 as matched to the timing at which the diameter of the ripple object OJ4 is equal to the diameter of its ripple determination unit J3. In other words, the ripple object OJ4 functions as an object OJ for which a touch operation corresponding to the second virtual operation image BO2 is demanded, at the timing at which their diameters agree with one another.

On the other hand, the third virtual operation image BO3 indicates a touch operation upon the triangular object OJ3. In concrete terms, the third virtual operation image BO3 indicates a touch operation of touching upon the triangular object OJ3 so as to move the touch position along its stream determination unit J2 from the start point thereof (at one end thereof) to the end point thereof (at the other end thereof). In other words the triangular object OJ3 functions as an object OJ for which a touch operation corresponding to the third virtual operation image BO3 is demanded, matched to the appearance and movement of the object OJ.

Furthermore, the fourth virtual operation image BO4 indicates a touch operation upon a square object OJ5. In concrete terms, the fourth virtual operation image BO4 indicates a touch operation in which the square object OJ5 is cut across, matched to its arrival at the ring determination unit J1. As one example, the fourth virtual operation image BO4 may indicate a touch operation of changing the touched position from left to right, so as to cut across the square object OJ5. In other words, the square object OJ5 functions as an object OJ for which touch operation corresponding to the fourth virtual operation image BO4 is demanded, matched to arrival of the object OJ5 at the ring determination unit J1. It should be understood that the direction of cutting is not limited to being left to right. Directions of various types may be employed, such as the vertical direction, a slanting direction, or the like.

As one example, the game machine GM may supply a music game in which, by employing various types of determination units J and various types of objects OJ, touch operations of various kinds are demanded upon positions of various kinds, matched to the rhythm of music. And, in the normal mode, this type of music game is mainly played alone. In concrete terms, touch operations upon each object OJ are evaluated, and a score or the like is awarded. In the normal mode, as one example, this type of music game may be supplied.

Next, the cooperative mode will be explained. In the cooperative mode, a music game such as that described above is played on a cooperative basis by a plurality of users. The plurality of users all play the same music game while each using one of the plurality of game machines GM. In other words, as one example, game machines GM corresponding to each user are matched together, and the same music game is played simultaneously by all the users who are matched together via those game machines GM. And, as one example, in the cooperative mode, demands included in the music game, in other words demands for touch operations upon the objects OJ, are allocated between the users. Furthermore, the music game is played so that each user performs touch operation upon an object or objects OJ that have been allocated to him as his responsibility. In other words, the objects OJ are shared out so that the users can play the music game cooperatively. As one example, in the cooperative mode, the music game is played via this type of cooperation.

As one example, the cooperative mode includes an allocation setting phase and a play phase. The allocation setting phase is a phase for setting the allocation of the objects OJ. And the play phase is a phase for playing the music game in a shared manner, on the basis of the results of allocation in the allocation phase.

Figure 6:
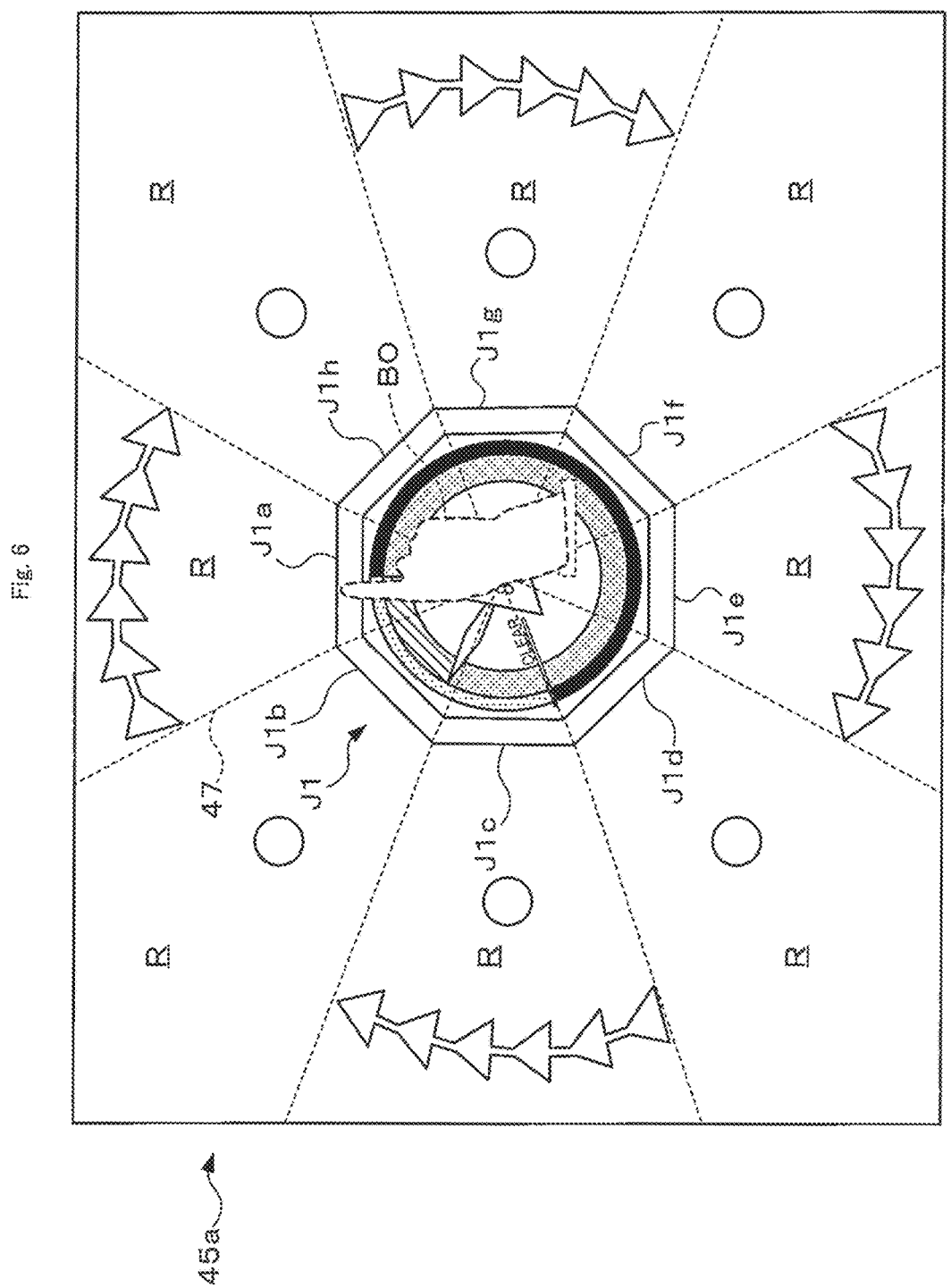
FIG. 6 is a figure schematically showing an example of a region setting game screen for setting regions of responsibility.

First, the allocation phase will be explained with reference to FIGS. 6 through 8. As one example, the allocation of each object OJ may be set by dividing the game screen 45 into individual regions for which the various users are responsible, which serve as responsibility command regions. FIG. 6 is a figure schematically showing an example of a region setting game screen 45a for setting these regions of assigned responsibility. As shown in FIG. 6, as one example, this region setting game screen 45a may include eight allocated regions R, which serve as command regions. The allocated regions R are regions based upon the sides of the ring determination unit J1, into which the field is divided up. As a result, the ring determination unit J1 is positioned in the neighborhood of the center of the eight allocated regions R, so as to straddle over the allocated regions R. And touch operation upon each side of this ring determination unit J1 is performed by one of the users, with the allocated region R that corresponds to this side upon which touch operation is performed being set as his region of responsibility. In other words, the regions of responsibility are set on the basis of each user designating one side of the ring determination unit J1. Then, the objects OJ corresponding to the determination units J included in each region of responsibility are set to be in the charge of the corresponding user.

In concrete terms, as one example, the ring determination unit J1 may have first through eighth sides J1a through J1h. The broken lines in the FIG. 6 example show the boundary lines 47 that correspond to the boundaries of the allocated regions R (these lines may not actually be displayed). The boundary lines 47 are extended so as to divide the ring determination unit J1 into the first side J1a through the eighth side J1h. And the users are required to perform touch operations upon the sides J1a through J1h, which are distinguished from one another by the boundary lines 47. In the FIG. 6 example, a virtual operation image BO is shown that corresponding to a touch operation that designates the first side J1a. In this case, the allocated region R that corresponds to the first side J1a is set as the region of responsibility for this user who has designated the first side J1a. Furthermore, the first side J1a through the eighth side J1h of the ring determination unit J1 respectively function as the plurality of "reference sections" of the Claims. It should be understood that, if a side that is not designated is present, such as if the number of participants is less than eight or the like, then the allocated region R corresponding to that side may, for example, be allocated to a computer as its responsibility; or it would also be acceptable further to allocate it to one of the users, so that it belongs to his region of responsibility R1 (on the basis of a condition that is determined in advance, or on the basis of user designation or the like).

Figure 7:
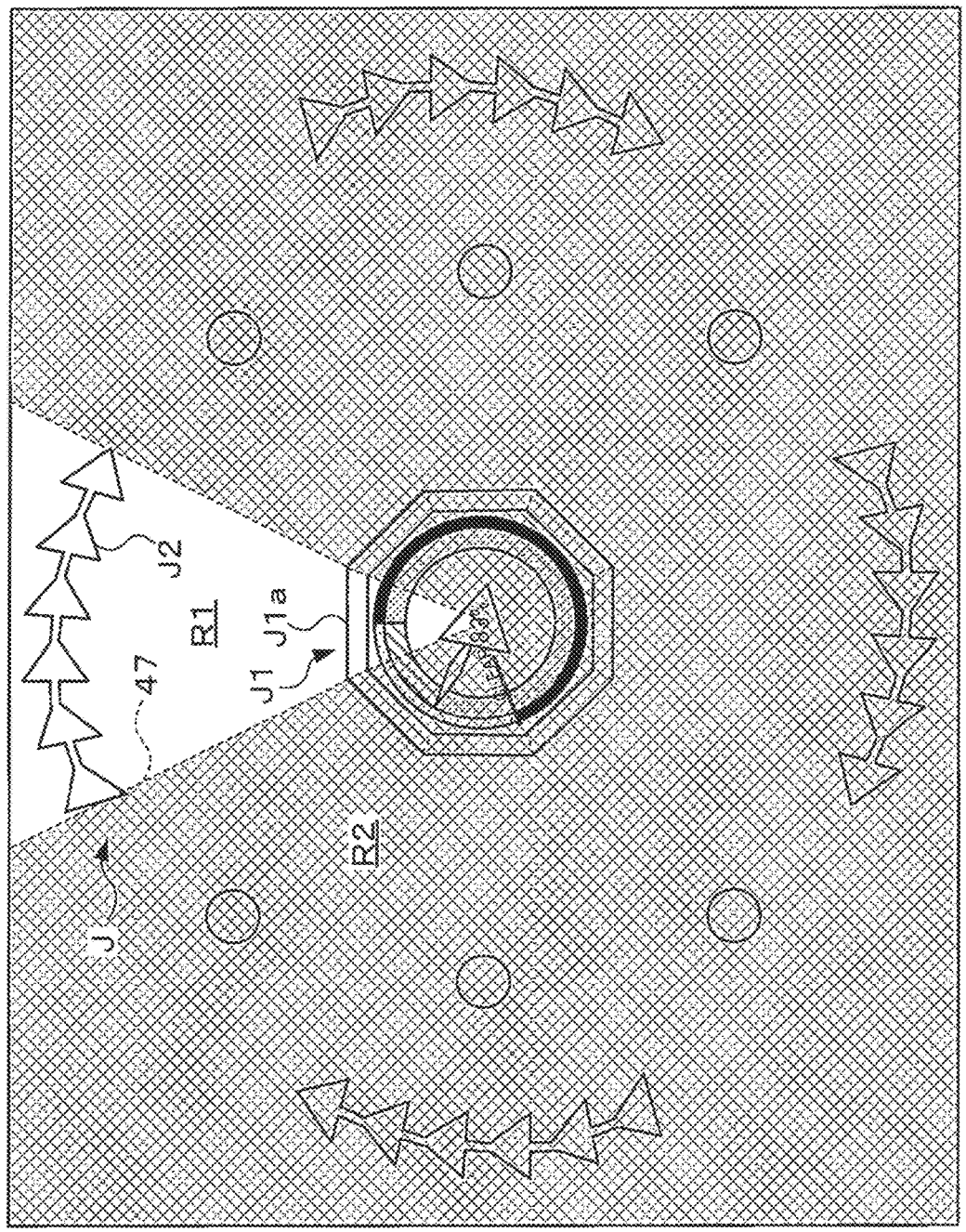
FIG. 7 is a figure schematically showing an example of a responsibility region game screen that is supplied to a user who has designated a first side of a ring determination unit.
Figure 8:
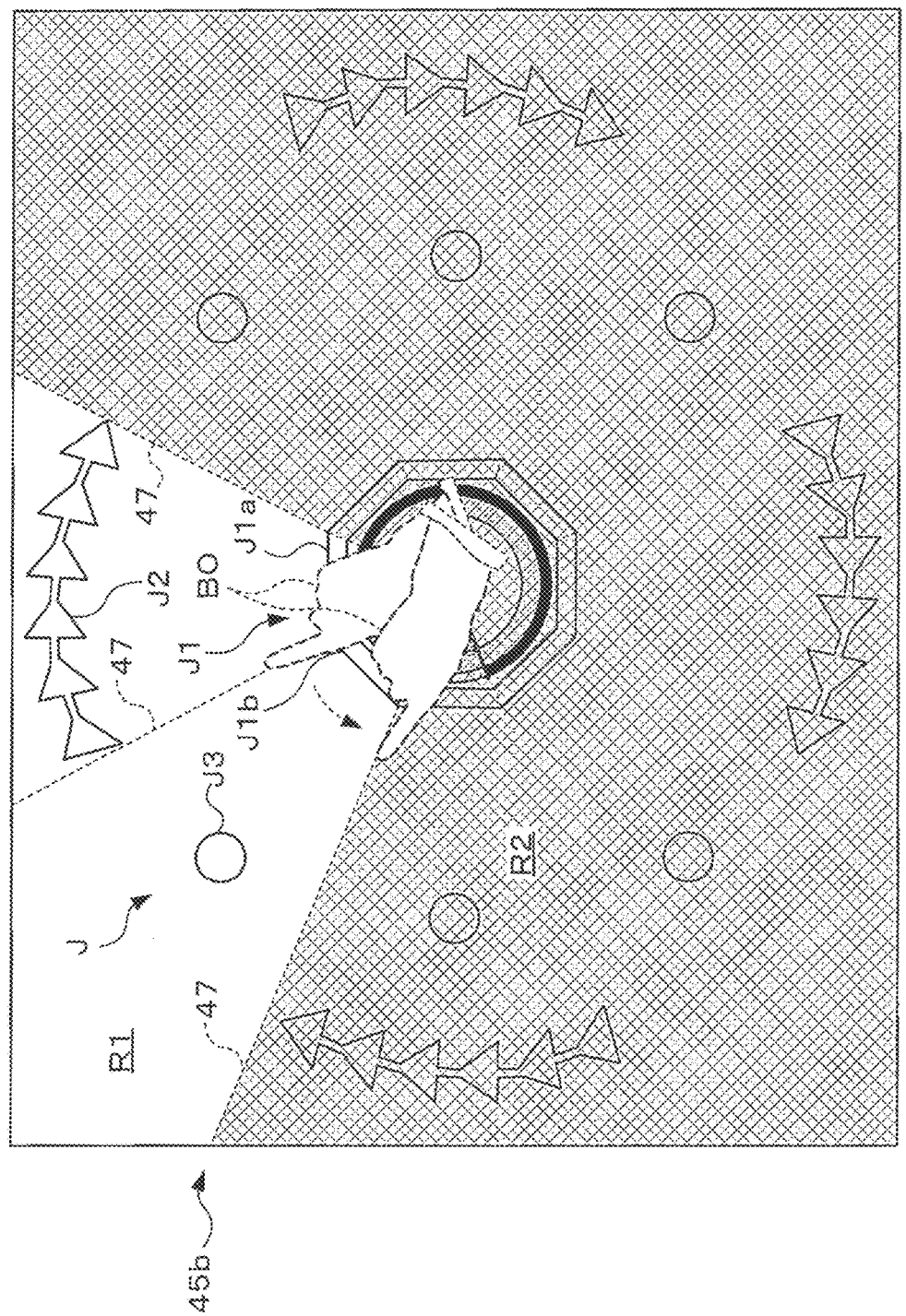
FIG. 8 is an explanatory figure for explanation of an example of a case in which the region of responsibility of FIG. 7 has been increased in size so as to include a second side.

FIG. 7 is a figure schematically showing an example of a responsibility region game screen 45b that is supplied to the user who has designated the first side J1a of the ring determination unit J1. As shown in FIG. 7, the responsibility region game screen 45b includes his region of responsibility R1 and another region R2 serving as another command region that is not a region of responsibility. The region of responsibility R1 corresponds to the one of the allocated regions R that is the portion for which this user is responsible. On the other hand, the other region R2 corresponds to allocated regions R that are other than that region of responsibility R1. As one example, the other region R2 may be visually distinguished from the region of responsibility R1 by marking or the like. In other words, on the responsibility region game screen 45b, the game screen 45 is divided into the region of responsibility R1 and the other region R2. And, to contrast these two regions, for example, all the objects OJ and all the determination units J in the region of responsibility R1 may be displayed as being easy to see just as they appear upon the normal game screen 45, but in the other region R2 they may be displayed so that telling them apart is more difficult, as compared to the region of responsibility R1.

In the example of FIG. 7, the allocated region R that corresponds to the first side J1a of the ring determination unit J1 is set as the region of responsibility R1. On the other hand, the remaining allocated regions R other than the allocated region R corresponding to the first side J1a of the ring determination unit J1 are collectively set as the other region R2. And the region of responsibility R1 includes the first side J1a of the ring determination unit J1 and the stream determination unit J2 above it. Accordingly, the first side J1a of the ring determination unit J1 and the stream determination unit J2 above it are allocated to the user who is in charge of the region of responsibility R1 as determination units J for which he is responsible. In other words, the object OJ that arrives at the first side J1a of the ring determination unit J1 and the triangular object OJ3 that moves along the stream determination unit J2 above it are allocated as objects of responsibility for the user who has designated the first side J1a.

Moreover, on the responsibility region game screen 45b, objects OJ and determination units J in the region of responsibility, i.e. those objects and units that are in the charge of this user, in other words the objects OJ and so on in his region of responsibility R1, are displayed in a manner so that they are easy to see, while objects OJ and so on in the other region R2 are displayed in a manner so that they are difficult to see. To put this in another manner, both the objects OJ assigned as responsibilities and the objects OJ not assigned as responsibilities are displayed upon the responsibility region game screen 45b via the region of responsibility R1 and the other region R2, but there is some difference with regard to the ease with which they can be seen. To the user who has specified the first side J1a of the ring determination unit J1, for example, the shown responsibility region game screen 45b is supplied as the game screen 45, upon which the two regions R1 and R2 are distinguished in this manner. Moreover, demands for appropriate touch operation upon the objects OJ function as the "demands" of the Claims. As a result, an appropriate touch operation upon an object OJ that corresponds to the region of responsibility R1 functions as a "play action assigned as a responsibility" of the Claims, while a demand for such appropriate touch operation functions as a "responsibility demand" of the Claims. In a similar manner, the user who is in charge of the region of responsibility R1 functions as the "single user" of the Claims. On the other hand, a demand for appropriate touch operation upon an object OJ that corresponds to the other region R2 functions as an "other demand" of the Claims.

Moreover, it would also be acceptable for the range of the region of responsibility R1 to be changed after designation of the sides of the ring determination unit J1. FIG. 8 is an explanatory figure for explanation of an example of a case in which the region of responsibility R1 of FIG. 7 is increased in size so as to include the second side J1b. As shown in FIG. 8, along with touch operation corresponding to the virtual operation image BO, the region of responsibility R1 is enlarged so as not only to include the first side J1a of the ring determination unit J1, but so as also to include its second side J1b. In concrete terms, as the virtual operation image BO, a type of touch operation is shown that causes the boundary line 47 of the allocated region R corresponding to the first side J1a to be moved to the position of the boundary line 47 corresponding to the second side J1b. Along with this, the range of the region of responsibility R1 is increased up to a range that includes both the first side J1a and also the second side J1b. In other words, the enlarged region of responsibility R1 now includes the two allocated regions R that respectively correspond to the first side J1a and to the second side J1b. As a result, in the example of FIG. 8, as compared to the example of FIG. 7, the second side J1b and one of the ripple determination units J3 on the left side (at the upper portion) are added as determination units J assigned to this user as responsibilities. Accordingly, in the example of FIG. 8, the objects OJ corresponding to these determination units are also added as responsibility portions. Information about the region of responsibility R1 that has been changed in this manner is transmitted to the game machines GM that are being used by other users who are matched to this user, and is reflected upon the game screen 45 in almost real time. And the regions of responsibility R1 of the various users are confirmed according to the end of the time period during which change is possible, or the like, and then the system transitions to the play phase.

On the other hand, in the play phase, the music game described above is supplied while reflecting the allocations in the allocation phase. And, in this phase, for example, via a responsibility region game screen 45b like that described above, appropriate touch operation upon the objects OJ of the region of responsibility R1 is demanded for the user who is responsible for that region of responsibility R1. The same is the case for the other users. In other words, a region of responsibility R1 is set for each user according to the specification of each user, and this region of responsibility R1 is displayed to him in a manner according to which it is distinguished from the other regions R2. And touch operations upon the determination units J that are included in these respective regions of responsibility R1 are demanded for each user. In other words, the objects OJ that arrive at or that appear at the determination units J of these regions of responsibility R1 are allocated as responsibilities to the various users, and touch operation upon those objects OJ is demanded for those users. As one example, this type of music game is supplied as the play phase.

Next, the details of the sequence data 39 and of the allocation data 19 will be explained. The sequence data 39 is data in which the operational timings at which touch operation must be performed are described. Accordingly, as one example, the sequence data 39 is used for displaying the objects OJ that move and so on along with the passage of time. In concrete terms, the objects OJ are displayed so as to correspond to the operational timings, and the objects OJ move (or their diameters change or the like) so as to guide the operational timings. Moreover, as one example, sequence data 39 of this type is prepared for each musical piece (or, furthermore, for each level of difficulty).

Figure 9:
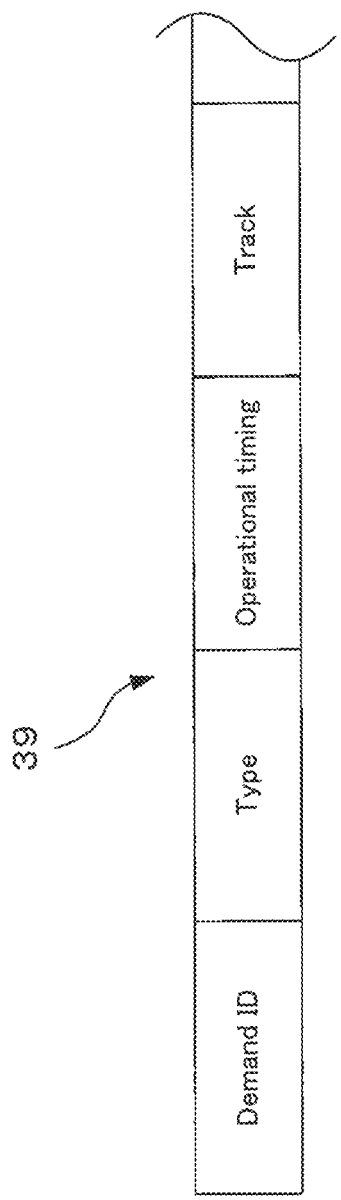
FIG. 9 is a figure showing an example of details of sequence data.

FIG. 9 is a figure showing an example of the contents of the sequence data 39. As shown in FIG. 9, as one example, the sequence data 39 includes information of a demand ID, a type, an operational timing, and a track. And, as one example, the sequence data 39 may be structured as a set of records in which these items of information are described so as to be in mutual correspondence.

The demand ID information is information for identifying the operational timings. Accordingly, information giving a unique ID for each operational timing is used as the demand ID information. And each of the operational timings (in other words, each of the objects that correspond thereto) is identified by a demand ID. Moreover, the type is information that specifies the type of each of the objects OJ. For example, information specifying the type of the object OJ, such as information identifying the individual object OJ1 or the like, may be used as information about the object type. In other words, the type of the object OJ that should correspond to the operational timing is specified according by the information about the type.

The operational timings are information as to when touch operations should be executed. Furthermore, each object OJ reaches the corresponding determination unit J (or appears at it, or agrees in diameter with it, or the like) at the corresponding operational timing, and so on. In other words, the operational timings may, for example, also function as arrival timings (or as appearance timings, or as diameter agreement timings). For example, information specifying the measure number in a musical piece, the number of beats, and a value that specifies the timing within a beat may be described in an operational timing, separated by commas. And a track is information specifying a track W for the ring, along which the corresponding object OJ moves. A track for the ring W extends from the position of appearance to the position of arrival at the ring. Accordingly, information about the track can also function as information about the position of appearance of the object and about its position of arrival at the ring (for example, in the case of a ripple object OJ4 or a triangular object OJ3, it would also be possible for information describing the position of appearance to be specified as the track information). As one example, the sequence data 39 may be configured in this way.

Figure 10:
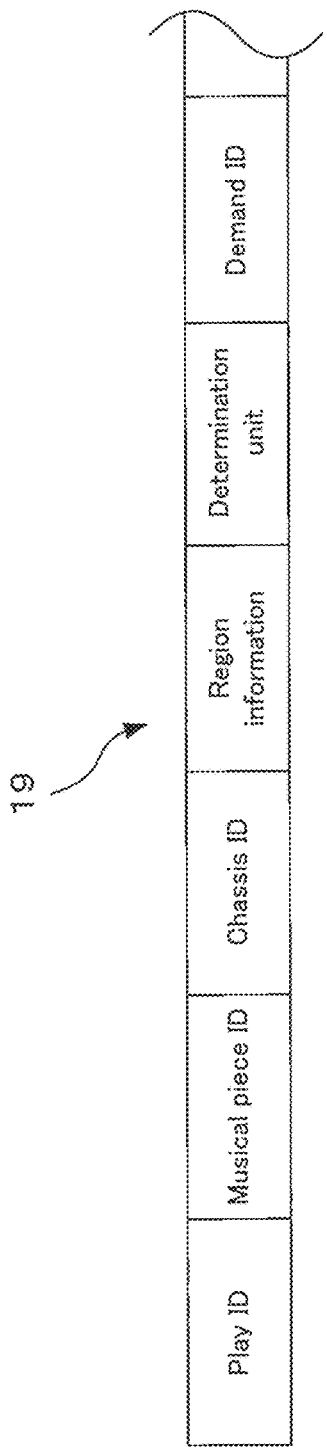
FIG. 10 is a figure showing an example of details of allocation data.

On the other hand, the allocation data 19 is data for defining the tasks allotted to each user in the cooperative mode. Accordingly, as one example, the allocation data 19 may be used for setting a region of responsibility R1 for each user and objects OJ that are assigned as responsibilities corresponding thereto and so on. In other words, the allocation data 19 functions as data for setting responsibility relations between the allocated regions R and so on, and the users. As a result, for example, the allocation data 19 may also be used for displaying the responsibility region game screen 45*b*. FIG. 10 is a figure showing an example of details of the allocation data. As shown in FIG. 10, as one example, the allocation data 19 may include information of a play ID, a musical piece ID, a chassis ID, region information, a determination unit, and demand ID. And, as one example, the allocation data 19 may be structured as a set of records in which these items of information are described in mutual correspondence. As a result, the allocation data 19 functions as the "responsibility relations information" of the Claims.

The play ID is a unique ID for each opportunity to play the music game. Accordingly, the information in the play ID functions as information for identifying each opportunity to play the music game. Furthermore, as a result, the play ID is also unique for each record, and is also used for specifying each record. The musical piece ID is as described above. Accordingly, the information consisting of the musical piece ID functions as information that specifies the musical piece that is to be used in playing the music game corresponding to each play ID. The chassis ID is a unique ID for each of the game machines GM. Accordingly, the information in the chassis IDs functions as information for identifying each game machine upon the network 3. In other words, each game machine GM is specified by its chassis ID information. As the chassis ID information, for example, some item of unique information that is assigned to each game machine GM may be used, such as an IP address, a MAC address, or the like. It should be understood that the information that is employed for specifying each of the game machines GM is not limited to being its chassis ID. Provided that each user is specified, it would also be acceptable to employ the user ID information described above, for example, instead of the chassis ID information.

The region information is information specifying each of the allocated regions R that are included in the game screen 45. In more concrete terms, the region information is information that specifies the allocated regions R in the game screen 45 that have been set as the regions of responsibility R1. In other words, the region information that specifies the allocated region R corresponding to the region of responsibility R1 of the user who is playing each game machine GM corresponds to its chassis ID. Moreover, if the range of the region of responsibility R1 has been enlarged or the like, so that a region of responsibility R1 is set that includes a plurality of the allocated regions R, then information specifying that plurality of allocated regions R may be provided as region information.

And the determination unit information is information specifying the determination units J that are included in the region of responsibility R1. In other words, the region information is in correspondence with the chassis IDs, and moreover the determination units J within the allocated region R specified by this region information are in correspondence with the determination unit information. And the demand ID is as described above. Accordingly, the demand ID information that specifies the operational timings corresponding to each object OJ that should arrive at the determination unit J specified by the determination unit information is described as the demand ID information. As one example, the allocation data 19 is structured in this manner.

Next, the allocation setting processing, the allocation display processing, and the actuation evaluation processing will be explained. The allocation setting processing is processing for setting the responsibilities of each of the users in the cooperative mode. As described above, as one example, the responsibility of each user is defined by the allocation data 19. Accordingly, as an example, the allocation setting processing is executed in order to generate the allocation data 19. On the other hand, the allocation display processing is processing for controlling display of the game screen 45, so that the responsibilities of each user are distinguished according to the responsibilities for each user that have been set by the allocation setting processing. As one example, the responsibilities of each user may be distinguished, via the responsibility region game screen 45*b*, as his region of responsibility R1 and his other region R2. Accordingly, as one example, the allocation display processing is executed in order to implement display of the responsibility region game screen 45*b*. Furthermore, the actuation evaluation processing is processing in order to evaluate touch operations by the users in the play phase of the music game.

Figure 11:
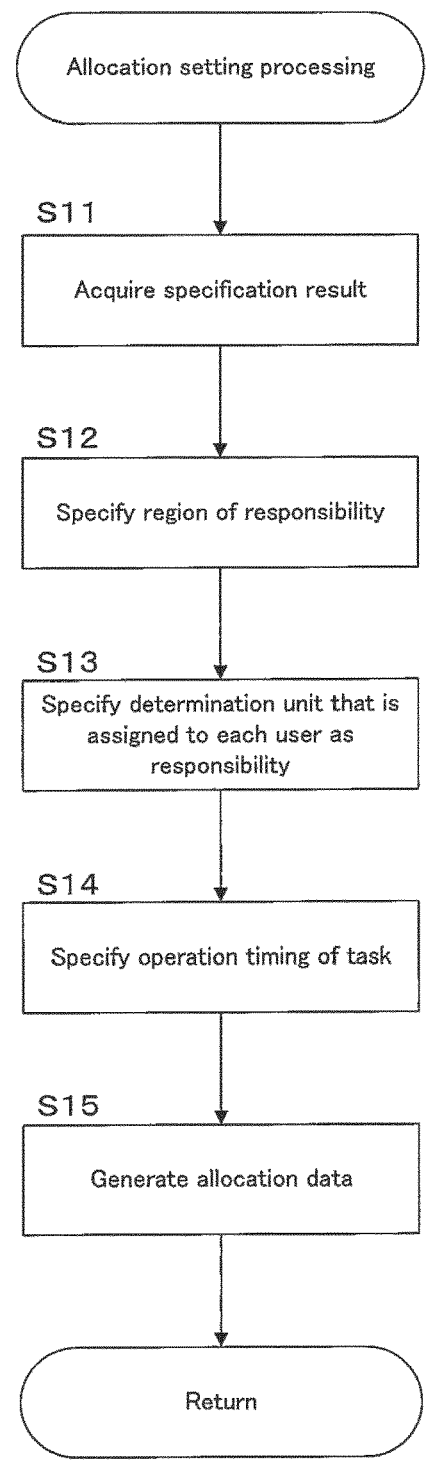
FIG. 11 is a figure showing an example of a flow chart for an allocation setting processing routine.

As one example, the allocation setting processing may be implemented by the control unit 10 of the central server 2 via the routine of FIG. 11. In concrete terms, the routine of FIG. 11 is executed by the control unit 10 via the game machine service management unit 16. On the other hand, the allocation display processing and the actuation evaluation processing are implemented by the control unit 30 of the game machine GM via the routine of FIG. 12 and the routine of FIG. 13. In concrete terms, as one example, the routine of FIG. 12 and the routine of FIG. 13 may be executed by the control unit 30 via the game provision unit 37. It should be understood that, apart from the processing mentioned above, the control unit 30 of the game machine GM and the control unit 10 of the central server 2 may also execute various types of per se known processing and so on, either singly or in mutual cooperation. However, detailed explanation thereof will be omitted.

FIG. 11 is a figure showing an example of a flow chart of an allocation setting processing routine for implementation of the allocation setting processing. As one example, the routine of FIG. 11 may be executed every time, in the cooperative mode, a responsibility is commanded by each of the users (for example, a designation of each side J1*a* through J1*h* of the ring determination unit J1).

When the routine of FIG. 11 is started, first in a step S11 the game machine service management unit 16 acquires the specification results for setting the responsibilities for each user. As one example, the responsibility specification for each user may be executed via specification of the sides J1*a* through J1*h* of the ring determination unit J1. Accordingly, for example, in the step S11, the game machine service management unit 16 may acquire the responsibility specification results for each of the sides J1*a* through J1*h* of each of the ring determination units J1 from each of the game machines GM.

Next in the step S12 the game machine service management unit 16 specifies a region of responsibility R1 for each user, on the basis of the results of acquisition in the step S11. In concrete terms, for example, the game machine service management unit 16 may specify the allocated regions R respectively corresponding to the sides J1*a* through J1*h* that have been specified by the users as their regions of responsibility R1.

In the next step S13, on the basis of the specification result in the step S12, the game machine service management unit 16 specifies the determination units J that are assigned to each user as responsibilities. In concrete terms, for example, the game machine service management unit 16 specifies the determination units J that are included in the region of responsibility R1 that was specified in the step S12 as being the determination units J assigned as responsibilities.

And next in the step S14, on the basis of the results of specification in the step S13 and on the basis of the sequence data 39, the game machine service management unit 16 specifies the operation timings of the tasks for each user. In concrete terms, for example, the game machine service management unit 16 specifies the operational timings that are associated with the determination units J specified in the step S13 by the sequence data 39 via the objects OJ that are to arrive at these determination units J and so on, as being the operational timings that are assigned as responsibilities.

In the next step S15, the game machine service management unit 16 generates allocation data, so as to include the specific results from the step S12 through the step S14. In concrete terms, as one example, the game machine service management unit 16 may generate this allocation data in the following manner. First, the game machine service management unit 16 acquires the play ID and the musical piece ID corresponding to the specification result that was acquired in the step S11 (it would also be acceptable for the play ID to be provided by the game machine service management unit 16). And next, the game machine service management unit 16 generates a record in which demand ID information corresponding to the region information corresponding to the region of responsibility R1 that was specified in the step S12, to the determination unit information corresponding to the determination units J that were specified in the step S13, and to the operational timings that were specified in the step S14, are put into correspondence with this play ID and with this musical piece ID. In other words, via this record, the game machine service management unit 16 establishes responsibility relations between the region information for the region of responsibility R1 that corresponds to the specified results, the determination unit information specifying the determination units J that correspond to that region information, and the demand ID information specifying the operational timings corresponding to those determination units J, and each game machine GM (corresponding to each user). And then the game machine service management unit 16 generates (or updates) the allocation data 19, so that the record in which these responsibility relations are established is included therein. As one example, the game machine service management unit 16 may generate the allocation data 19 in this manner in the step S15.

And, when the processing of the step S15 is complete, then the game machine service management unit 16 terminates this iteration of this routine. Due to this, responsibility relations are established between each user and each allocated region and so on, so as to set the regions of responsibility R1 on the basis of the results of specification by the users. In other words, on the basis of the results of specification by the users, the allocated regions R, the determination units J, and the operational timings are allocated to the users, so that they are divided up between the users.

Figure 12:
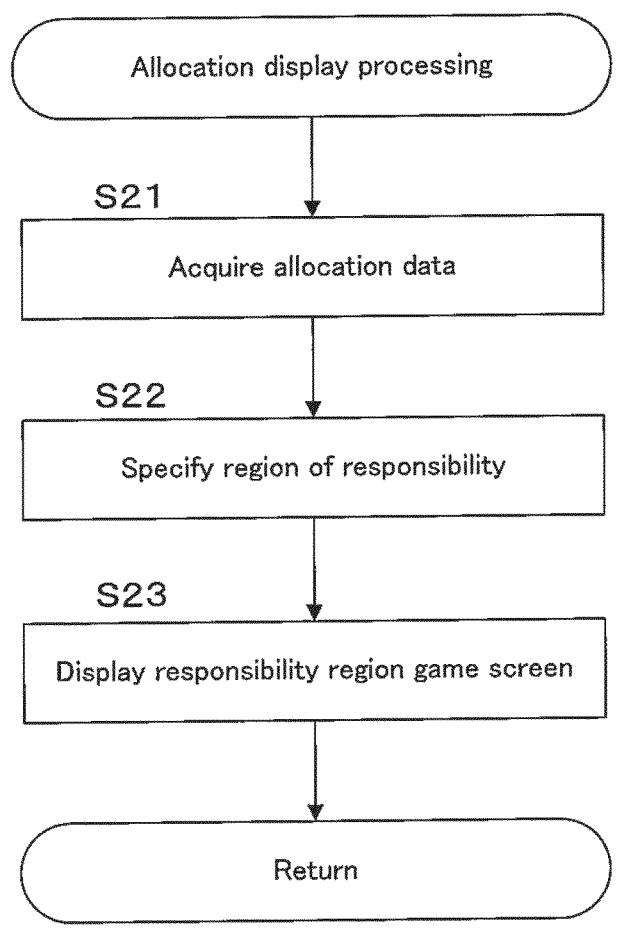
FIG. 12 is a figure showing an example of a flow chart for an allocation display processing routine.

Furthermore, FIG. 12 is a figure showing an example of a flow chart for an allocation display processing routine for implementing the allocation display processing. As one example, the routine of FIG. 12 is executed along with provision of the play phase.

When the routine of FIG. 12 is started, in a first step S21 the game provision unit 37 acquires the allocation data 19 from the central server 2. As one example, as described above, the allocation data 19 may be generated along with execution of the routine of FIG. 11, and before the execution of FIG. 12. And the allocation data 19 is, for example, acquired from the central server 2 as one of the game machine services, so that the necessary portion thereof is included.

In the next step S22, the game provision unit 37 specifies the region of responsibility R1 on the basis of the allocation data 19 acquired in the step S21. In concrete terms, for example, on the basis of the chassis ID that is included in the allocation data 19, the game provision unit 37 may specify a record corresponding to itself. And then the game machine service management unit 16 specifies the allocated region or regions R corresponding to the region information included in this specified record as being the region of responsibility R1. As one example, the game provision unit 37 may specify the region of responsibility R1 in this manner in the step S22.

And in the next step S23, on the basis of the specification result in the step S22, the game provision unit 37 displays the responsibility region game screen 45*b* upon the lower monitor section MO1. In concrete terms, on the basis of the specification result in the step S22, the game provision unit 37 displays the game screen 45 in which the region of responsibility R1 and the other region R2 are distinguished from one another upon the lower monitor section MO1 as the responsibility region game screen 45*b*. After the processing of this step S23 has been completed, the game provision unit 37 terminates this episode of this routine. Due to this, the responsibility region game screen 45*b* that displays the specification results for each user is displayed. And the region of responsibility R1 and the other region R2 can be distinguished via this responsibility region game screen 45*b*.

Figure 13:
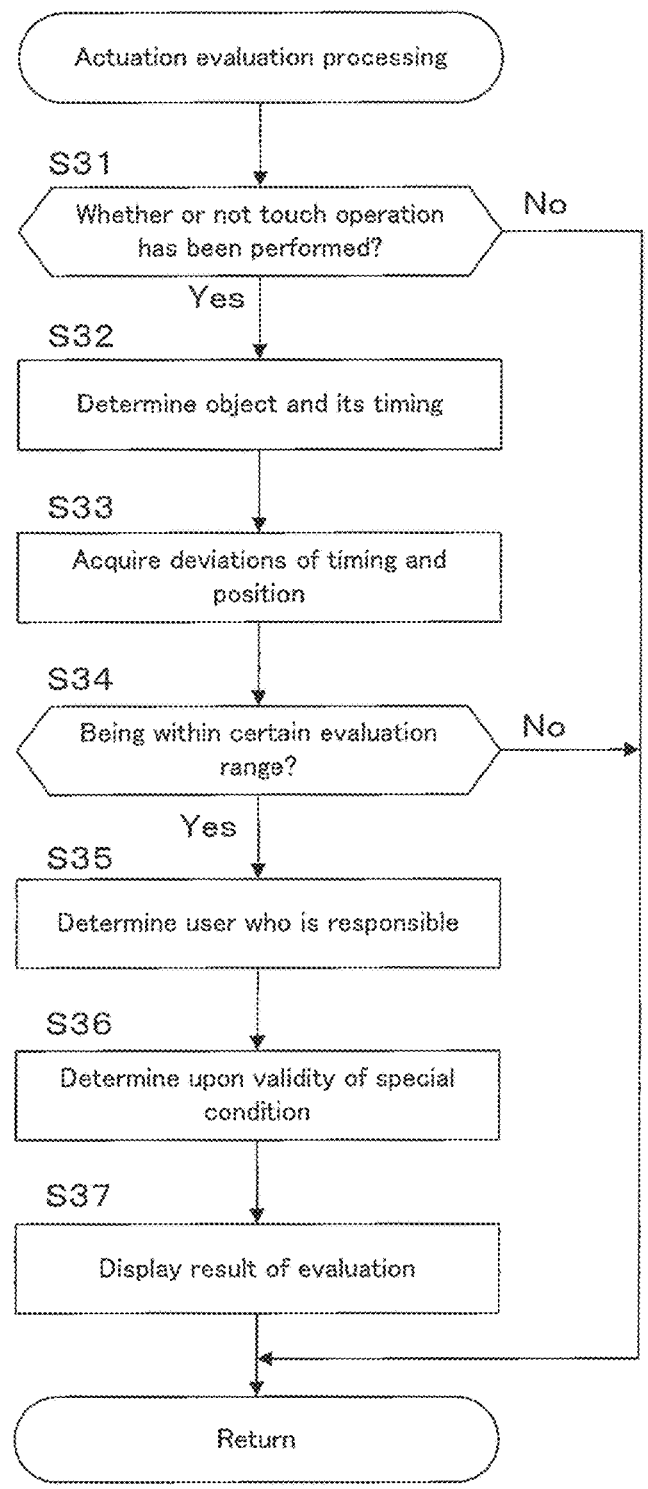
FIG. 13 is a figure showing an example of a flow chart for an actuation evaluation processing routine.

On the other hand, FIG. 13 is a figure showing an example of a flow chart for an actuation evaluation processing routine for implementing the actuation evaluation processing. As one example, in the play phase, the routine of FIG. 13 may be repeatedly executed on a predetermined cycle.

When the routine of FIG. 13 is started, in a first step S31, the game provision unit 37 determines whether or not touch operation has been performed upon the responsibility region game screen 45*b*, on the basis of the result outputted by the touch panel 9. If the result of this decision is negative, in other words if such touch operation has not been performed, then the game provision unit 37 skips the subsequent processing and terminates this iteration of the routine.

On the other hand, if the result of the decision in the step S31 is affirmative, in other words if such touch operation has been performed, then the game provision unit 37 transfers the flow of control to a step S32. In this step S32, on the basis of the result outputted by the touch panel 9, the game provision unit 37 determines the object OJ upon which the touch operation was performed, and its timing. Moreover, in this step S32, the game provision unit 37 also may determine the type of the touch operation.

In the next step S33, on the basis of the result of the determination performed in the step S32, the game provision unit 37 acquires the deviations between the object OJ upon which touch operation was actually performed and the timing of that touch operation, and the object OJ upon which touch operation ought to have been performed and the timing of that touch operation. For example, the object OJ upon which touch operation ought to have been performed and the operational timing of that touch operation are described in the sequence data 39. In concrete terms, as one example, the operation timing in the sequence data 39 that is closest to the timing of execution of the touch operation and the object OJ that corresponds to that operational timing may be identified as being the object OJ upon which touch operation is to be performed and the operational timing of that touch operation. And, as one example, in the step S32, the game provision unit 37 may acquire the time interval of deviation between this object OJ that was identified and its operational timing, and the object OJ upon which touch operation was actually executed and the timing of this execution. As a result, the sequence data 39 functions as the "evaluation criterion" of the Claims.

Then in the next step S34 the game provision unit 37 determines whether or not the deviation of timing and the deviation of position that have been acquired in the step S33 are within certain evaluation ranges. In other words, in this step S34, the game provision unit 37 determines whether or not the touch operation that was performed corresponded to an appropriate touch operation. Accordingly it would also be acceptable, in this determination, to include determination of whether or not the type of this touch operation that has been executed is a type that corresponds to the type of the object OJ upon which this touch operation was executed. For example, based upon the operational timing at which the touch operation ought to have been executed, a predetermined range of timing before and after that timing may be employed as the timing evaluation range. In other words, a predetermined range of timing that includes the operational timing at its center may, as one example, be employed as the evaluation range for the timing. In a similar manner, for example, the interior of the object OJ and its exterior within a predetermined range from its external periphery may be employed as the evaluation range for the timing. And, if the result of the determination in this step S34 is negative, in other words if, as one example, at least one of the timing and the position is not included within its evaluation range (and it will also be acceptable to include the case in which the type of the touch operation does not correspond to the type of the object), then the game provision unit 37 skips the subsequent processing, and this iteration of this routine terminates.

On the other hand, if the result of the determination in this step S34 is affirmative, in other words if, as one example, the deviations of both the timing and the position are included within their evaluation ranges (and it will also be acceptable further to include the case in which the type of the touch operation corresponds to the type of the object OJ), then the game provision unit 37 advances the flow of control to a step S35. In this step S35, the game provision unit 37 determines the user who is responsible for the object OJ upon which the touch operation was performed. As described above, responsibility for each of the objects OJ is set by the allocation data 19 via the operational timing. Accordingly in the step S35, for example, the game provision unit 37 may first, on the basis of the sequence data 39, specify the operational timing corresponding to the object OJ upon which the touch operation was performed. Subsequently, on the basis of the allocation data 19, the game provision unit 37 specifies the chassis ID (i.e. the game machine GM) that corresponds to this operational timing (demand ID) that has been specified. And then, on the basis of this chassis ID that has been specified, the game machine GM (corresponding to a user) to which this responsibility has been assigned is determined. As one example, the game provision unit 37 determines the responsibility in this manner in the step S35.

In the next step S36, the game provision unit 37 determines upon the validity of a special condition. As such a special condition, for example, a condition may be employed that is satisfied when a predetermined number of appropriate touch operations have been successively performed. Furthermore, whether or not a predetermined number of appropriate touch operations have been successively performed may, for example, be determined not only for a single user, but for a plurality of users. In other words, as one¬ example, whether or not the predetermined number of appropriate touch operations have been successively performed may be determined while including, not only touch operations upon the objects OJ assigned as responsibilities to this user, but also touch operations upon the objects OJ not assigned as responsibilities to him. Yet further, touch operations upon the objects OJ that are not assigned as responsibilities may not be limited to the case in which such touch operations are performed by the users to whom responsibility therefor is assigned, but also may include the case in which they are performed by users who are not thus assigned responsibility. As one example, the game provision unit 37 may determine in the step S36 whether or not this type of special condition is satisfied.

Next, in the step S37, the game provision unit 37 displays the results of evaluation. In addition, the results of the determinations in the step S35 and the step S36 are reflected in these evaluation results. In concrete terms, as one example, the game provision unit 37 may display the results of evaluation in the following manner. For example, if an appropriate touch operation is performed upon an object OJ assigned as a responsibility, then the game provision unit 37, for example, may provide a display showing the appropriate touch action, and may display the total score as the result of evaluation. Moreover if, on the basis of the result of the determination in the step S36, the special condition is satisfied, then an evaluation corresponding to the special condition (for example, a special evaluation such as the award of a special score or the like) may further be displayed as a result of the evaluation.

On the other hand, touch operation upon an object OJ that is not assigned as a responsibility may either be evaluated or not evaluated. For example, if touch operation upon an object OJ that is not assigned as a responsibility is not evaluated, then, if the subject of appropriate touch operation is the object not assigned as a responsibility, then the game provision unit 37 may, as the result of evaluation, display the information that it is out of the subject of evaluation or out of addition points or the like. On the other hand, if touch evaluation upon an object OJ that is not assigned as a responsibility is evaluated, then, even if the subject of appropriate touch operation is an object OJ not assigned as a responsibility, the game provision unit 37 may, for example, add to the score or the like in a similar manner to the case for a subject of responsibility (including award of a score for a special condition, or the like). Furthermore, it would also be acceptable for appropriate touch operation upon an object OJ that is not assigned as a responsibility to be evaluated as being higher than touch operation upon a portion that is assigned as a responsibility. In this case, as one example, as a result of such appropriate touch operation upon an object OJ that is not assigned as a responsibility, the game provision unit 37 may display, as the result of evaluation, an added score that is higher than in the case of appropriate touch operation upon an object OJ that is a subject of responsibility. Alternatively, if the appropriate touch operation upon the object OJ that is not assigned as a responsibility is executed as overlapped over a touch operation by the user who is responsible for it, then it would be acceptable to display, as the result of evaluation, the higher of the evaluation scores for those two touch operations. As one example, the game provision unit 37 may display the result of evaluation in this manner in the step S37.

And, when the processing of the step S37 is completed, the game provision unit 37 terminates this iteration of the routine. Due to the above, the appropriateness of the various touch operations upon the objects OJ during the play phase is evaluated, and the results of evaluation corresponding thereto are displayed. Moreover, the results of allocation of the objects, and whether or not special conditions were provided, are also reflected in these evaluation results.

As explained above, according to this embodiment, in the cooperative mode, demands for touch operation upon objects OJ in the music game are allocated to users who are playing cooperatively together. And touch operation upon the subjects of responsibility is evaluated on the basis of the results of this allocation. Accordingly, it is possible for the objects OJ in the music game to be shared between the users who are playing together.

Furthermore, with regard to the objects OJ and so on, the region of responsibility R1 for display of the objects OJ that are assigned as responsibilities and so on and the other region R2 for display of the objects OJ that are not assigned as responsibilities and so on are displayed so as to be mutually distinguished. In other words, via the display of the regions of responsibility R1, it is possible for the objects OJ and so on that are assigned as responsibilities to be easily recognized by each of the users.

Moreover, not only the objects OJ that are assigned as responsibilities but also the objects OJ that are not assigned as responsibilities can easily be recognized by the users, via the regions of responsibility R1 and the other regions R2, although there are some differences in how easily they can be seen. Due to this, it is possible for the users recognize the state of play of other users, via the other regions R2. In other words, the users are able to play upon their own regions of responsibility R1 while ascertaining the states of play by the other users. Accordingly, if for example, due to a special condition or the like, a special evaluation is reached also in consideration of the result of another user, it is possible to bring this fact to the attention of the users. Furthermore, when an appropriate touch operation upon an object OJ that is not assigned as a responsibility is evaluated, it is possible to urge each of the users to follow other users. Due to this, it is possible to enhance the level of interest of the music game in the cooperative mode.

In the embodiment described above, by executing the routine of FIG. 11 via the game machine service management unit 16, the control unit 10 of the central server 2 functions as the "relationship setting device" of the Claims. Furthermore, by executing the routine of FIG. 12 via the game provision unit 37, the control unit 30 of the game machine GM functions as the "information acquisition device" and as the "demand teaching device" of the Claims. Yet further, by executing the routine of FIG. 13 via the game provision unit 37, the control unit 30 of the game machine GM functions as the "evaluation device" of the Claims.

The present invention is not to be considered as being limited to the embodiment described above; it may be implemented in various other appropriate ways. For example, in the embodiment described above, similar determination units J were employed in the cooperative mode and in the normal mode. However, the present invention is not limited to this type of embodiment. For example, it would also be acceptable to employ different determination units J in the cooperative mode and in the normal mode. For example, in the cooperative mode the ring determination unit J1 could shaped as a square, or as a hexagon or the like. Moreover, it would also be acceptable to arrange for the number of sides of the ring determination unit J1 in the cooperative mode to correspond to the number of users who are participating in the game. In other words, it would be acceptable to arrange for the shape of the ring determination unit J1 to change according to the number of participants. In a similar manner, it would also be acceptable to arrange for these numbers to change between the cooperative mode and the normal mode, so that, in the cooperative mode, the number of ripple determination units J3 and/or of stream determination units J2 that are included is equal to the number of regions of responsibility R1. Moreover, for example, it would also be possible for one or more of the stream determination units J2 or the like to be disposed so as to straddle over a plurality of the regions of responsibility R1. In this case, the stream determination unit J2 or the like may be used by a single user who is assigned, as a responsibility, that one of the regions of responsibility R1 to which that unit belongs; or it could also be used in common by the users of several of the regions of responsibility R1. And in this case, for example, the stream determination unit J2 that straddles across the plurality of regions of responsibility R1 functions as the "target unit" of the Claims, and the portion of this stream determination unit J2 that belongs to the regions of responsibility R1 functions as the "reference section" of the Claims.

In the embodiment described above, the regions of responsibility R1 are set on the basis of designation by the users. However, the present invention is not to be considered as being limited to this type of embodiment. For example, it would also be acceptable for the regions of responsibility R1 to be set in a fixed manner in advance, by initial setting in units of allocated regions R or the like. Moreover, in the embodiment described above, although the other regions R2 were displayed so that they could be seen, they were relatively difficult to see. However, the present invention is not to be considered as being limited to this type of embodiment. For example, it would also be acceptable for the other regions R2 to be masked so that they cannot be seen at all. Alternatively, it would be possible for only the regions of responsibility R1 to be displayed in enlarged view.

Yet further, in the embodiment described above, the objects OJ are allocated on the basis of the regions of responsibility R1. However, the allocation of the objects OJ is not to be considered as being limited to this type of format. For example, it would also be acceptable for the objects OJ to be allocated for each type of the individual objects OJ1 and/or of the triangular objects OJ3 or the like. In this case, for example, as in the embodiment described above, it will be acceptable for the portions of responsibility and the other portions to be distinguished according to differences in the shapes and/or the colors of the objects OJ. Furthermore, for example, it would also be acceptable for the responsibilities to be allocated according to the periods (i.e. the parts) or the types of the musical instruments.

In the embodiments described above, each of the game machines GM supplies a music game. However, the games that are supplied by the game machines GM are not to be considered as being limited to being music games. It will be acceptable for the game machines GM to supply a game of any of various types, such as an action game, a role playing game, a simulation game, a shooting game, or the like, provided that the game includes a plurality of demands that are to be executed by a plurality of users.

FIG. 14 is an explanatory figure for explanation of an example of an action game that includes a plurality of demands. As shown in FIG. 14, as one example, a game screen 50 of this action game may include user characters 51 corresponding to each user and an enemy character 52. Moreover, the enemy character 52 may include sites 52a, 52b, and 52c that function as subjects for attack by the user characters 51. And it will also be acceptable for these sites 52a through 52c to be shared by the users (or by a plurality of the users). In other words, attacks against the sites 52a through 52c may function as a plurality of demands. Furthermore it would also be acceptable, for example, to distinguish a site 52b (i.e. the body portion) which is assigned as a portion of responsibility and other sites 52a and 52c which are not assigned as a responsibility (i.e. the head portion and both the hand portions) by displaying the site 52b assigned as a responsibility as white, while displaying the sites 52a and 52c other than the one that is assigned as a responsibility as hatched or the like. The user characters 51 who are assigned the responsibility of the responsibility site 52b and the other user characters 51 may also be distinguished in a similar manner.

In a similar manner, the game machine GM is not to be considered as being limited to only being a commercial game machine. As the game machine GM, for example, a stationary type game machine for home use (including a stationary type personal computer that is capable of executing a game), a portable type game machine (including a portable terminal such as a smart phone, a tablet PC, and a portable type personal computer and the like that are capable of executing a game) and so on may be employed, as appropriate. Furthermore, in the embodiment described above, the control unit 30 and the storage unit 31 were provided to the game machine GM. However, the game machine of the present invention is not to be considered as being limited to such a form. For example, the control unit 30 and the storage unit 31 may be provided logically on the network by employing cloud computing. In other words, it would be acceptable for the game machine GM to be built as a terminal that provides and displays the results of processing by the control unit 30 via the network 3. Moreover, it would also be possible for the game system of the present invention to be implemented as a single game machine, with the center server 2 being omitted.

In the following, examples of the concept of the present invention based upon the details described above are described. It should be understood that, although in the explanation below reference symbols that refer to the attached drawings are included and are written in parentheses in order to make the present invention easier to understand, the present invention is not to be considered as being limited by these reference symbols in any way.

The game system of the present invention is a game system (1) that provides a game played simultaneously by a plurality of users, wherein the game system comprises: an information acquisition device (30) configured to, if the game includes a plurality of demands to the plurality of users, acquire information (19) about responsibility relations that are set between the plurality of demands and the plurality of users, so that the plurality of demands are respectively allocated to the plurality of users; and a demand teaching device (30) configured to, on the basis of the results of acquisition by the information acquisition device, teach a responsibility demand which is directed to a single user of the plurality of users, so that the responsibility demand, among the plurality of demands, for which a responsibility relation is set to at least the single user, is distinguished from other demands.

According to the present invention, for the plurality of demands in the game, responsibility relations are set so that these demands are allocated to the plurality of users. And teaching is implemented on the basis of these responsibility relations, so that the demands assigned as responsibilities and other demands can be distinguished. Due to this, in the game, it is possible to share the plurality of demands between the plurality of users.

According to one aspect of the game system of the present invention, there may be further included a display device (MO1) configured to display a game screen (45b) that includes a plurality of command regions (R) for respectively teaching the plurality of demands; and wherein the demand teaching device, by establishing a discrepancy between the display of a responsibility command region (R1) that corresponds to the responsibility demand and the display of other command regions, may teach the responsibility demand so that this responsibility demand is distinguished from the other demands. In this case, it is possible to distinguish the responsibility demand from the other demands via the discrepancy in the displays.

The display of the discrepancies may be provided in various different ways. For example, according to one aspect of the game system of the present invention, it would be acceptable for the demand teaching device to establish the discrepancy between the display of the responsibility command region and the display of the other command regions, so that teaching of the responsibility demand that is displayed in the responsibility command region is easier to see, than teaching of the other demands that are displayed in the other command regions. In this case, it is possible for a single user to recognize, not only the responsibility demand, but also the other demands.

The responsibility relations may be set in any appropriate manner. For example, according to one aspect of the game system of the present invention, the plurality of command regions may include a plurality of reference sections (J1a through J1h) that respectively correspond to the plurality of demands; and the responsibility relation may be set between a demand and the single user, so that the demand that corresponds to a reference section that, among the plurality of reference sections, have been specified by the single user, functions as the responsibility demand. Moreover, in this aspect of the present invention, it would also be acceptable to arrange for the game screen to include a target unit (J1) that is arranged so as to straddle over the plurality of command regions; and portions of the target unit that belong to the command regions function as the reference sections.

Furthermore, subjects of various types may be employed as the game. According to one aspect of the game system of the present invention, as the game, a timing game may be employed that guides a player to a plurality of timings via movement of a plurality of command marks (OJ) that respectively move so as to arrive at the plurality of reference sections, matched to a rhythm; and in the timing game, at the plurality of timings, as the plurality of demands, a plurality of play actions may be demanded, respectively corresponding to the plurality of command marks.

The results of guidance for the responsibility demand may be employed in any appropriate manner. For example, according to one aspect of the game system of the present invention, it would also be acceptable to employ a mode in which there is further included an evaluation device (30) configured to, on the basis of an evaluation criterion (39), evaluate a play action assigned as a responsibility for the responsibility demand. Moreover, in this aspect, it would also be acceptable to arrange for the demand teaching device to teach both the demand and the other demands, so that the responsibility demand is distinguished from the other demands; and the evaluation device further evaluates other play actions corresponding to the other demands on the basis of the evaluation criterion. Furthermore, in this aspect, it would also be acceptable for the evaluation device, on the basis of the results of evaluation of the play action that is assigned as responsibility and the other play actions, to award a special evaluation when the result of evaluation satisfies a special condition.

Moreover, the information about the responsibility relations may be acquired in any appropriate manner. For example, according to one aspect of the game system of the present invention, it will be acceptable for there to be further included: each game machine (GM) that provides the game; and a server apparatus (2) that is connected to each game machine via a network (3), and that supplies game machine services to each game machine; and wherein: the server apparatus comprises a relationship setting device (10) configured to set the responsibility relations between the plurality of demands and the plurality of users, so that the plurality of demands are respectively allocated to the plurality of users; and as one of the game machine services, the information acquisition device acquires information about the responsibility relations from the server apparatus, on the basis of the results of setting by the relationship setting device.

And the control method of the present invention causes a computer (30), installed to a game system (1) that provides a game played simultaneously by a plurality of users, to execute: an information acquisition procedure of, if the game includes a plurality of demands to the plurality of users, acquiring information (19) about responsibility relations that are set between the plurality of demands and the plurality of users, so that the plurality of demands are respectively allocated to the plurality of users; and a demand teaching procedure of, on the basis of the results of acquisition by the information acquisition device, teaching a responsibility demand which is directed to a single user of the plurality of users, so that the responsibility demand, among the plurality of demands, for which a responsibility relation is set to at least the single user, is distinguished from other demands.

And the non-transitory computer readable storage medium stores a computer program for a game system of the present invention which is adapted to cause a computer (30), installed to a game system (1) that provides a game played simultaneously by a plurality of users, to function as: an information acquisition device configured to, if the game includes a plurality of demands to the plurality of users, acquire information (19) about responsibility relations that are set between the plurality of demands and the plurality of users, so that the plurality of demands are respectively allocated to the plurality of users; and a demand teaching device configured to, on the basis of the results of acquisition by the information acquisition device, teach a responsibility demand which is directed to a single user of the plurality of users, so that the responsibility demand, among the plurality of demands, for which a responsibility relation is set to at least the single user, is distinguished from other demands. The game system of the present invention can be implemented by execution of the control method or the computer program of the present invention.

What is claimed is:

1. A game system that provides a timing game played simultaneously by a plurality of users, the timing game including a plurality of demands to the plurality of users, wherein the game system comprises:
    a data storage device that stores sequence data in which information of the plurality of demands are described as a series of records, each demand representing a required play action to be performed by one of the users at a specified operation timing during the timing game; and
    a control unit that includes a microprocessor and is connected to the data storage device, and
    wherein the control unit serves as:
    an information acquisition device that acquires information about responsibility relations that are set between the plurality of demands and the plurality of users, so that the plurality of demands described as the series of records in the sequence data are respectively allocated to the plurality of users and shared by the plurality of users such that the plurality of demands allocated to each user include a different portion from other users; and
    a demand teaching device that, on the basis of the results of acquisition by the information acquisition device, teaches a demand allocated to one of the plurality of users, so that the demand allocated to the one of the plurality of users is distinguished from other demands.

2. A game system according to claim 1, further comprising a display device configured to display a game screen that includes a plurality of command regions for respectively teaching the plurality of demands; and wherein
    the demand teaching device distinguishes the demand allocated to the one of the users from the other demands by establishing a discrepancy between the display of the command region that corresponds to the demand allocated to the one of the plurality of users and the display of other command regions.

3. A game system according to claim 2, wherein the demand teaching device establishes the discrepancy between the display of the command region that corresponds to the demand allocated to the one of the plurality of users and the display of the other command regions, so the demand allocated to the one of the plurality of user is visually emphasized.

4. A game system according to claim 2, wherein:
    the plurality of command regions include a plurality of reference sections that respectively correspond to the plurality of demands; and
    the responsibility relation is set between a demand of the plurality of demands and the one of the plurality of users, so that the demand of the plurality of demands corresponds to a reference section of the plurality of reference sections that, have been specified by the one of the plurality of users.

5. A game system according to claim 4, wherein:
    the game screen includes a target unit that is arranged so as to straddle over the plurality of command regions; and portions of the target unit that belong to the command regions function as the reference sections.

6. A game system according to claim 5, wherein:
the timing game guides a user to a plurality of timings via movement of a plurality of command marks that respectively move so as to arrive at the plurality of reference sections, matched to a rhythm; and
a plurality of demands, having respective play actions, are displayed at the plurality of timings, respectively corresponding to the plurality of command marks.

7. A game system according to claim 1, further comprising an evaluation device configured to, on the basis of an evaluation criterion, evaluate a play action assigned as a responsibility for the demand allocated to the one of the plurality of users, wherein the control unit serves as the evaluation device.

8. A game system according to claim 7, wherein:
the demand teaching device teaches both the demand allocated to the one of the plurality of users and the other demands, so that the demand allocated to the one of the plurality of users is distinguished from the other demands; and
the evaluation device further evaluates other play actions corresponding to the other demands on the basis of the evaluation criterion.

9. A game system according to claim 7, wherein, on the basis of the results of evaluation of the play action and the other play actions, the evaluation device awards a special evaluation when the result of evaluation satisfies a special condition.

10. A game system according to claim 1, further comprising:
each game machine that provides the game; and
a server apparatus that is connected to each game machine via a network, and that supplies game machine services to each game machine; and wherein:
the server apparatus comprises a relationship setting device configured to set the responsibility relations between the plurality of demands and the plurality of users, so that the plurality of demands are respectively allocated to the plurality of users; and
as one of the game machine services, the information acquisition device acquires information about the responsibility relations from the server apparatus, on the basis of the results of setting by the relationship setting device.

11. A control method for a game system that provides a timing game played simultaneously by a plurality of users, the timing game including a plurality of demands to the plurality of users, the control method causes the game system to execute:

a storing step of storing sequence data in which information of the plurality of demands are described as a series of records, each demand representing a play action to be performed by one of the users at a specified operation timing during the timing game;
an information acquisition procedure that acquires information about responsibility relations that are set between the plurality of demands and the plurality of users, so that the plurality of demands described as the series of records in the sequence data are respectively allocated to the plurality of users and shared by the plurality of users such that the plurality of demands allocated to each user include a different portion from other users; and
a demand teaching procedure that, on the basis of the results of acquisition by the information acquisition device, teaches a demand allocated to one of the plurality of users, so that the demand allocated to the one of the plurality of users is distinguished from other demands.

12. A non-transitory computer readable storage medium storing a computer program adapted to cause a computer, installed to a game system that provides a time game played simultaneously by a plurality of users, the timing game including a plurality of demands to the plurality of users, the computer program further adapter to cause the computer to function as:
a data storage device that stores sequence data in which information of the plurality of demands are described as a series of records, each demand representing a play action to be performed by one of the users at a specified operation timing during the timing game; and
a control unit that includes a microprocessor and is connected to the data storage device, and
wherein the control unit serves as:
an information acquisition device that acquires information about responsibility relations that are set between the plurality of demands and the plurality of users, so that the plurality of demands described as the series of records in the sequence data are respectively allocated to the plurality of users and shared by the plurality of users such that the plurality of demands allocated to each user include a different portion from other users; and
a demand teaching device that, on the basis of the results of acquisition by the information acquisition device, teaches a demand allocated to one of the plurality of users, so that the demand allocated to the one of the plurality of users is distinguished from other demands.

* * * * *